US012576659B2

(12) United States Patent
Yanagisawa et al.

(10) Patent No.: US 12,576,659 B2
(45) Date of Patent: Mar. 17, 2026

(54) RIBBON CARTRIDGE

(71) Applicant: SEIKO EPSON CORPORATION, Tokyo (JP)

(72) Inventors: Atsushi Yanagisawa, Matsumoto (JP); Akio Ishimoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 18/410,178

(22) Filed: Jan. 11, 2024

(65) Prior Publication Data

US 2024/0239123 A1 Jul. 18, 2024

(30) Foreign Application Priority Data

Jan. 12, 2023 (JP) ................................ 2023-003265

(51) Int. Cl.

*B41J 32/00* (2006.01)
*B41J 2/325* (2006.01)
*B41J 3/407* (2006.01)

(52) U.S. Cl.

CPC ............... *B41J 32/00* (2013.01); *B41J 2/325* (2013.01); *B41J 3/4075* (2013.01)

(58) Field of Classification Search

CPC . B41J 32/00; B41J 2/325; B41J 3/4075; B41J 33/14; B41J 15/044; B41J 17/32

See application file for complete search history.

(56) References Cited

U.S. PATENT DOCUMENTS

| | | | | |
|---|---|---|---|---|
| 2018/0079238 | A1 | 3/2018 | Kubota et al. | |
| 2022/0072881 | A1 * | 3/2022 | Ishimoto | B41J 3/4075 |

FOREIGN PATENT DOCUMENTS

| | | | |
|---|---|---|---|
| JP | 2020-104326 | A | 7/2020 |
| KR | 2017-0125906 | A | 11/2017 |

* cited by examiner

*Primary Examiner* — Kristal Feggins

(74) *Attorney, Agent, or Firm* — Oliff PLC

(57) ABSTRACT

There is provided a ribbon cartridge, in which a cartridge case is provided with a cartridge-side tape inlet, and a cartridge-side tape outlet, a first case portion and a second case portion are combined by a plurality of case engagement portions including a second B engagement pin provided at the second case portion and a first B engagement hole provided at the first case portion and engaged with the second B engagement pin, and the cartridge-side tape inlet is provided at a position at which a distance from one case engagement portion of the plurality of case engagement portions is smaller than a dimension of the cartridge-side tape inlet in a lateral direction.

16 Claims, 16 Drawing Sheets

RIBBON CARTRIDGE

The present application is based on, and claims priority from JP Application Serial Number 2023-003265, filed Jan. 12, 2023, the disclosure of which is hereby incorporated by reference herein in its entirety.

BACKGROUND

1. Technical Field

The present disclosure relates to a ribbon cartridge that can be mounted on a tape printing apparatus.

2. Related Art

In the related art, as disclosed in JP-A-2020-104326, a ribbon cartridge which includes an ink ribbon and a cartridge case accommodating the ink ribbon, and is attachable to and detachable from a tape printing apparatus is known. The cartridge case is provided with a tape inlet that introduces tape, which serves as a printing medium, from an outside of the cartridge case into the cartridge case.

In the cartridge case provided with the tape inlet, a rigidity of the cartridge case is decreased, and thus, the cartridge case may bend or a part of the cartridge case may be deformed.

SUMMARY

According to an aspect of the present disclosure, there is provided a ribbon cartridge configured to be mounted on a tape printing apparatus including: an ink ribbon; and a cartridge case that accommodates the ink ribbon, in which the cartridge case includes a first case portion, and a second case portion provided in a first direction with respect to the first case portion, the cartridge case is provided with a tape inlet that is formed in a long shape in a direction parallel to the first direction, and introduces a tape from an outside of the cartridge case into the cartridge case, and a tape outlet that discharges the tape introduced into the cartridge case to the outside of the cartridge case, the first case portion and the second case portion are combined by a plurality of case engagement portions including an engagement projection portion provided at one of the first case portion and the second case portion and an engagement recess portion provided at another of the first case portion and the second case portion and engaged with the engagement projection portion, and the tape inlet is provided at a position at which a distance from one case engagement portion of the plurality of case engagement portions is smaller than a dimension of the tape inlet in a lateral direction of the tape inlet.

DESCRIPTION OF EMBODIMENTS

Figure 15:
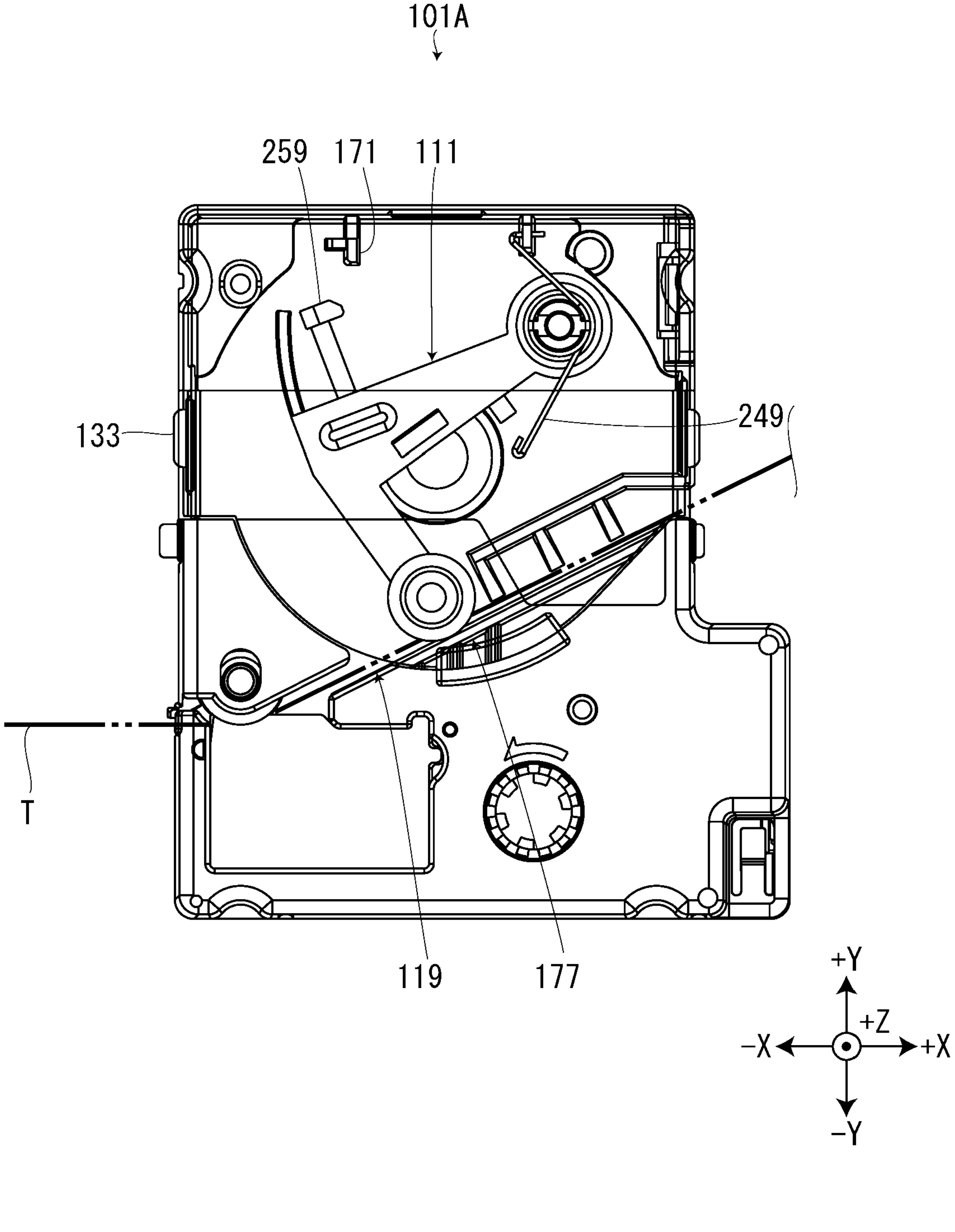
FIG. 15 is a view of the ribbon cartridge in a state in which the tape is inserted into the tape path and the second A case portion is mounted on the first case portion, as viewed from the +Z direction.
Figure 16:
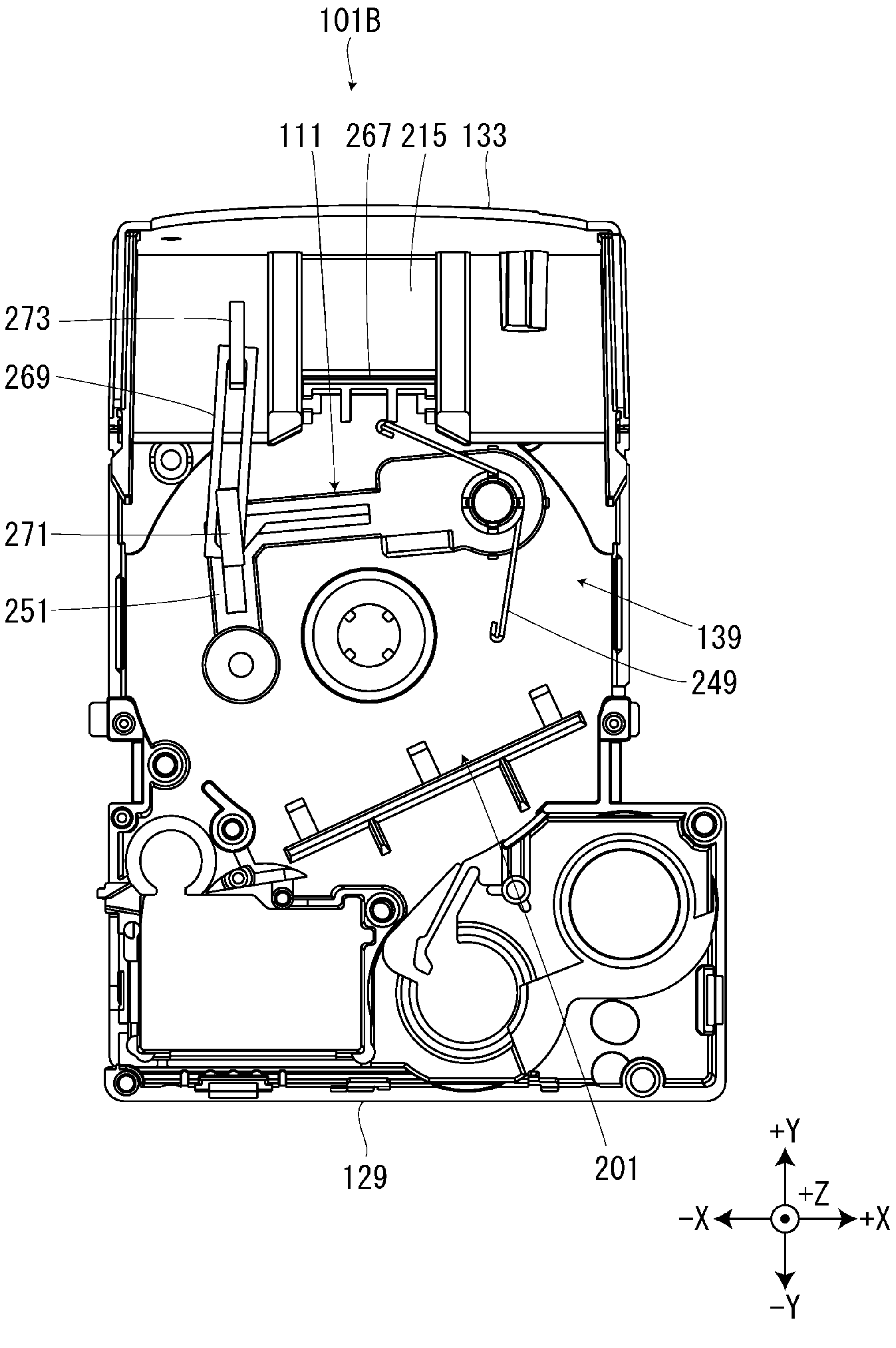
FIG. 16 is a cross-sectional diagram of the ribbon cartridge in a state in which the second A case portion opens a tape presser accommodating portion, as viewed from the +Z direction.
Figure 17:
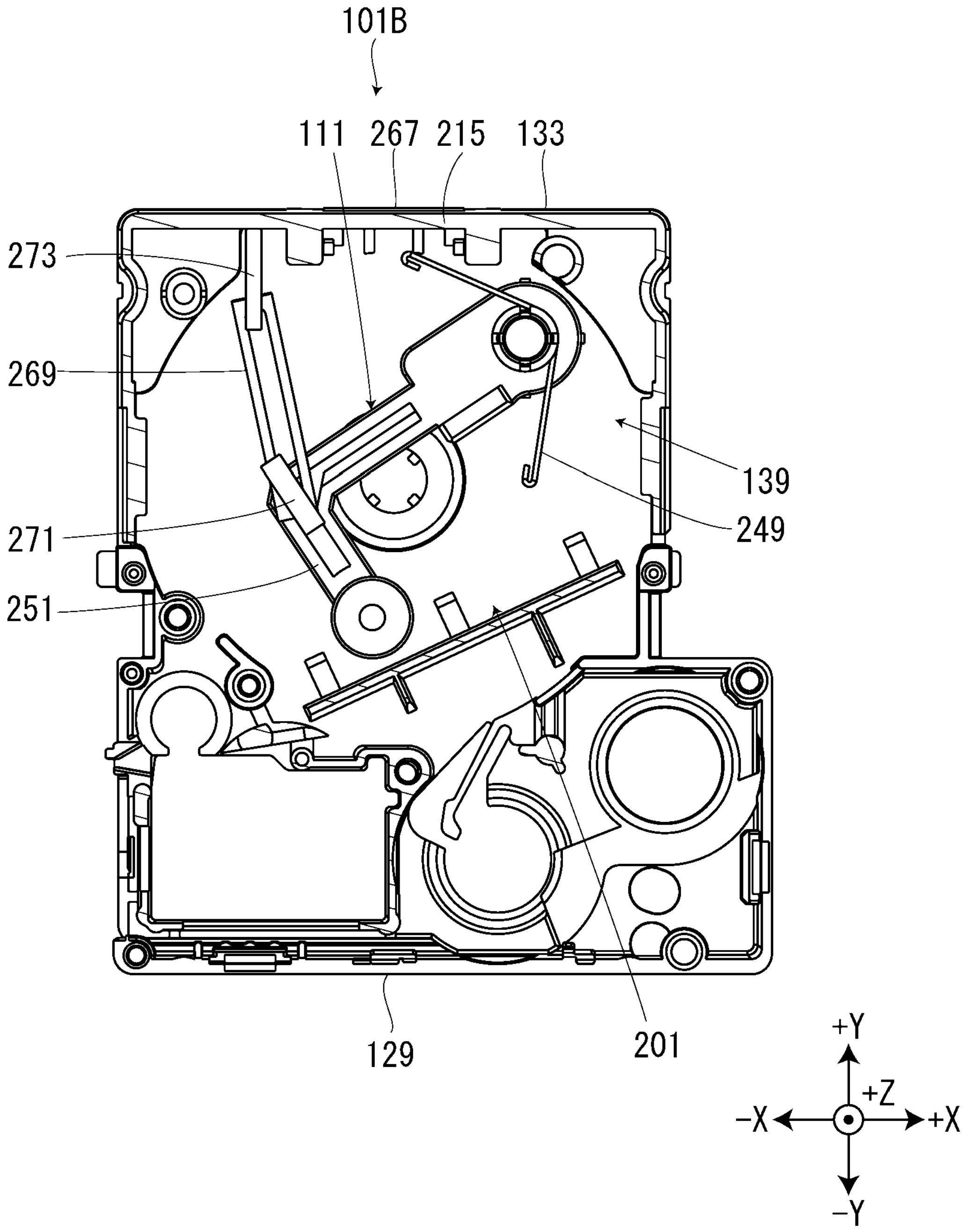
FIG. 17 is a view of the ribbon cartridge in a state in which the second A case portion closes the tape presser accommodating portion, as viewed from the +Z direction.

Hereinafter, one embodiment of a ribbon cartridge will be described with reference to the accompanying drawings. FIGS. 1 to 15 are views illustrating a first embodiment of the ribbon cartridge, and FIGS. 16 and 17 are views illustrating a second embodiment of the ribbon cartridge. In the following, directions based on the XYZ orthogonal coordinate system illustrated in each drawing will be described. However, these directions are for convenience of explanation only and do not limit the following embodiments in any way. In addition, the number of each component is merely an example, and does not limit the following embodiments in any way.

First Embodiment

Figure 1:
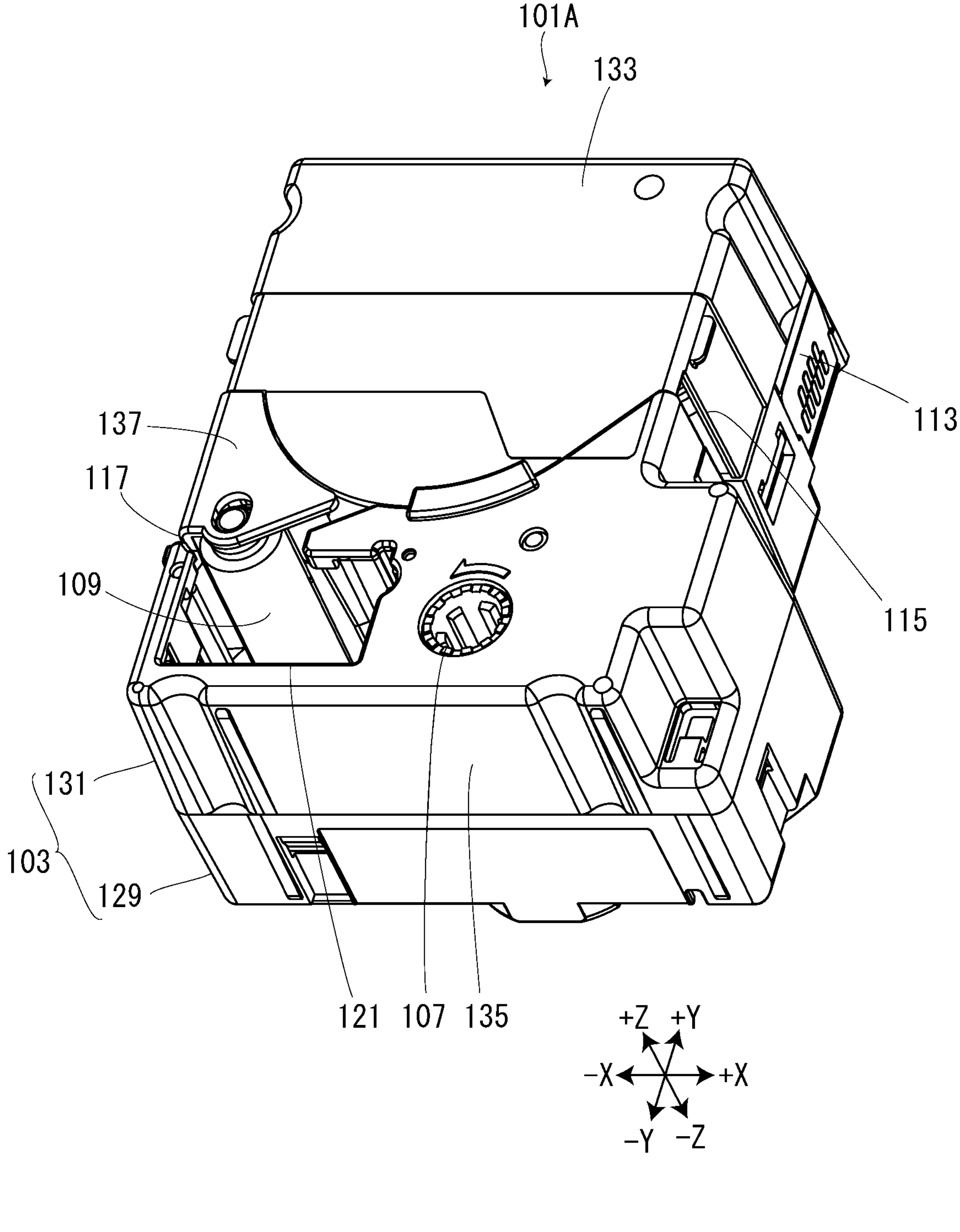
FIG. 1 is a perspective view of a ribbon cartridge.
Figure 2:
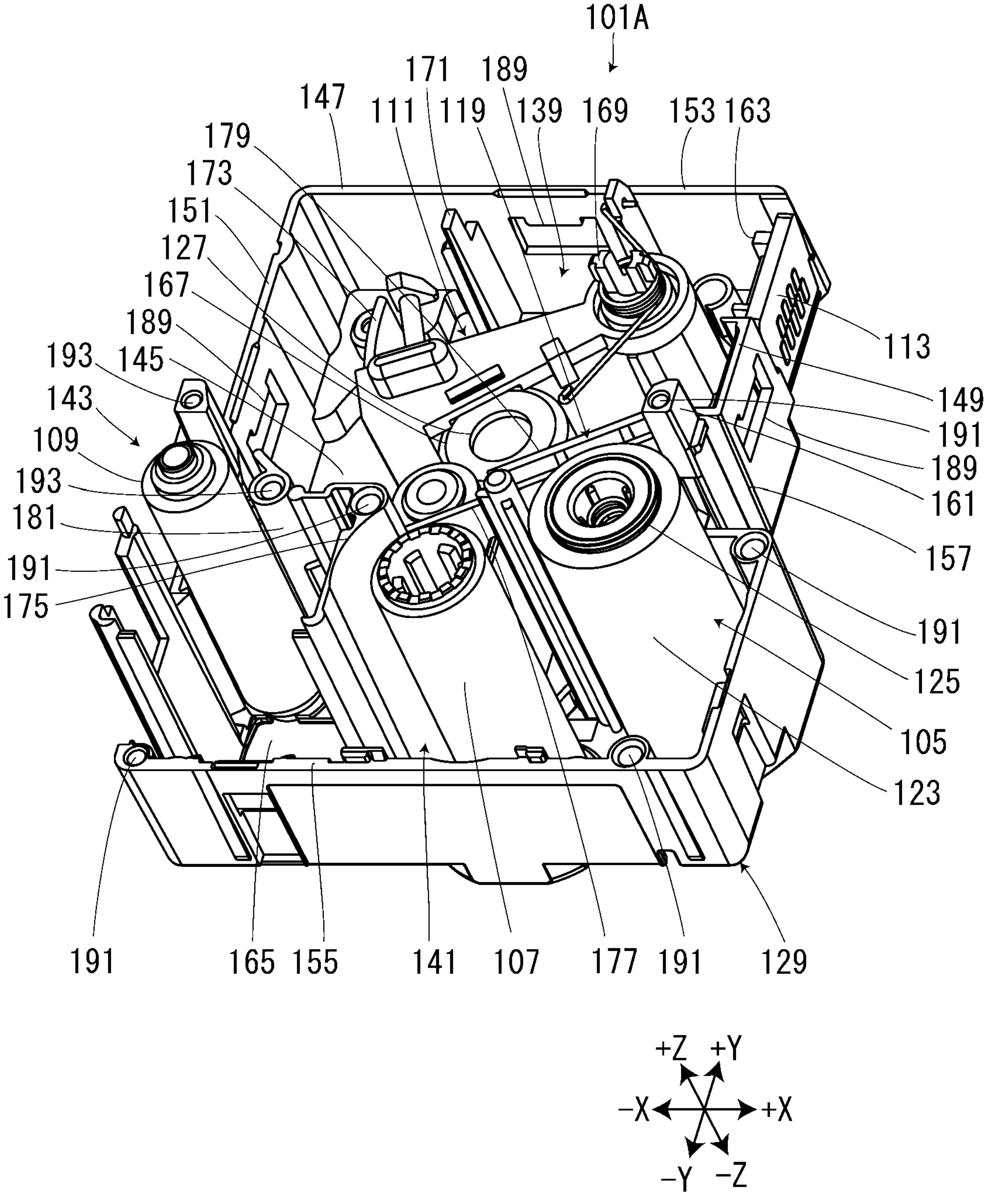
FIG. 2 is a perspective view of the ribbon cartridge illustrating a structure inside a cartridge case.

A ribbon cartridge 101A, which is a first embodiment of the ribbon cartridge, will be described with reference to FIGS. 1 and 2. The ribbon cartridge 101A includes a cartridge case 103, a ribbon roll 105, a winding core 107, a platen roller 109, a tape pressing portion 111, and a circuit substrate 113.

The cartridge case 103 accommodates the ribbon roll 105, the winding core 107, the platen roller 109, and the tape pressing portion 111. Further, the circuit substrate 113 is attached to the cartridge case 103. In FIG. 2, in order to illustrate a structure inside the cartridge case 103, a part of the cartridge case 103, that is, a second case portion 131, which will be described later, is not illustrated.

The cartridge case 103 is provided with a cartridge-side tape inlet 115, a cartridge-side tape outlet 117, a tape path 119, and a head insertion hole 121.

Figure 4:
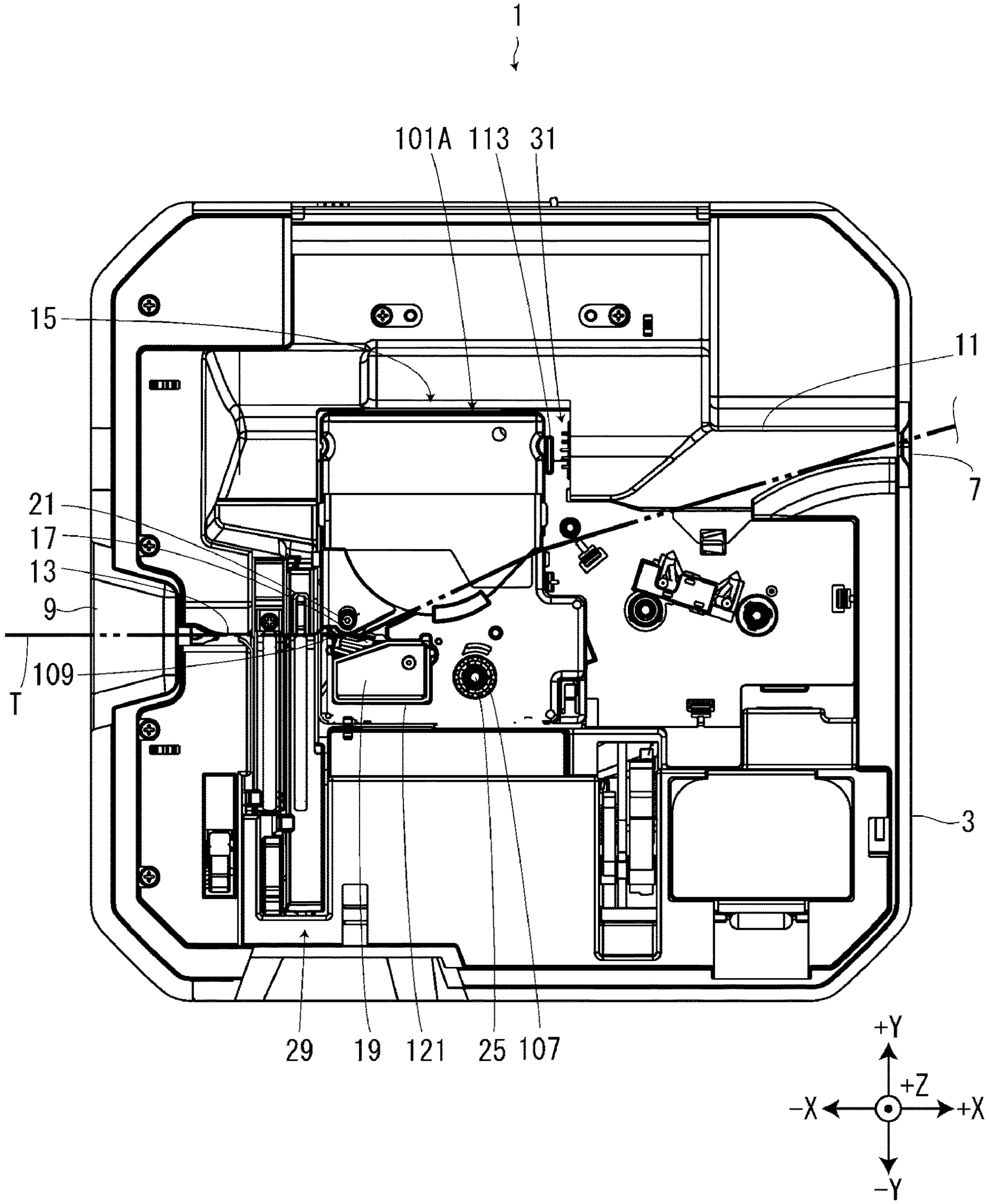
FIG. 4 is a view of the tape printing apparatus in a state in which the ribbon cartridge is mounted, as viewed from the +Z direction.

The cartridge-side tape inlet 115 is provided on a surface of the cartridge case 103 in a +X direction, and is formed in a substantially rectangular shape elongated in a Z-axis direction. As illustrated in FIG. 4, the cartridge-side tape inlet 115 introduces a tape T, which is a printing medium, from an outside of the cartridge case 103 into the cartridge case 103. That is, the tape T is introduced into the cartridge case 103 from the outside of the cartridge case 103 through the cartridge-side tape inlet 115 in a posture in which a width direction of the tape T is the Z-axis direction.

The cartridge-side tape outlet 117 is provided on a surface of the cartridge case 103 in the −X direction, and is formed in a substantially rectangular shape elongated in the Z-axis direction. The cartridge-side tape outlet 117 discharges the tape T introduced into the cartridge case 103 to the outside of the cartridge case 103. That is, the tape T is discharged from the inside of the cartridge case 103 through the cartridge-side tape outlet 117 to the outside of the cartridge case 103 in a posture in which the width direction of the tape T is the Z-axis direction.

The tape path 119 is a path from the cartridge-side tape inlet 115 to the cartridge-side tape outlet 117. The tape T introduced into the cartridge case 103 from the cartridge-side tape inlet 115 passes through the tape path 119, and is discharged from the cartridge-side tape outlet 117 to the outside of the cartridge case 103.

The head insertion hole 121 is provided to penetrate through the cartridge case 103 in the Z-axis direction. As illustrated in FIG. 4, a thermal head 17 and a head cover 19 provided in the tape printing apparatus 1 are inserted into the head insertion hole 121.

The ribbon roll 105 includes an ink ribbon 123 and a feeding core 125 around which the ink ribbon 123 is wound. The ink ribbon 123 fed from the feeding core 125 is wound around the winding core 107.

The platen roller 109 pinches the tape T and the ink ribbon 123 between the platen roller 109 and the thermal head 17 provided in the tape printing apparatus 1, and feeds the pinched tape T.

The circuit substrate 113 is provided on the surface of the cartridge case 103 in the +X direction. Various types of information such as the remaining amount of the ink ribbon 123 is stored in the circuit substrate 113 in a rewritable manner.

Tape Printing Apparatus

Figure 3:
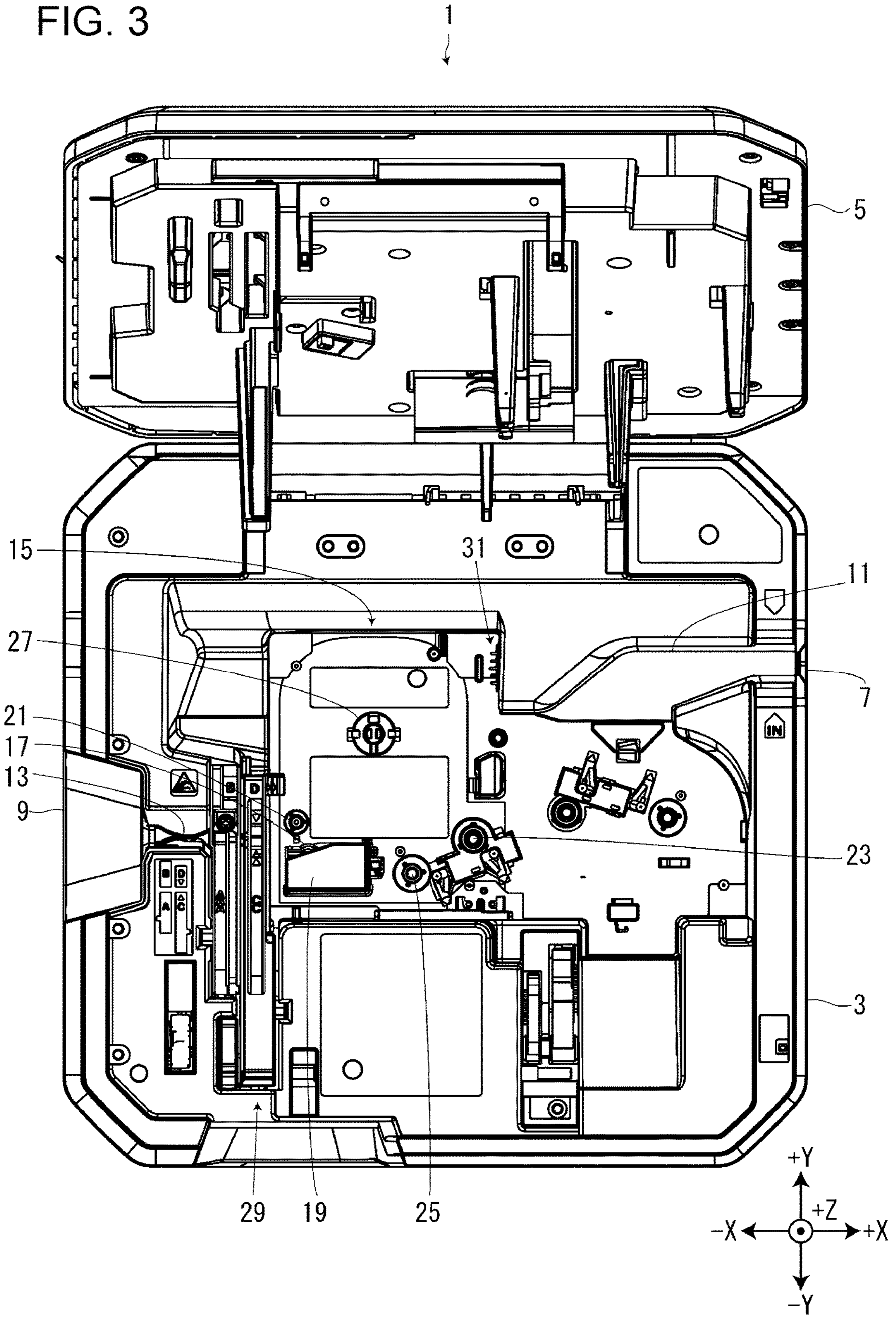
FIG. 3 is a view of a tape printing apparatus in a state in which the ribbon cartridge is not mounted, as viewed from a +Z direction.

The tape printing apparatus 1 in which the ribbon cartridge 101A is mounted will be described with reference to FIGS. 3 and 4. The tape printing apparatus 1 includes an apparatus case 3 and a mounting portion cover 5. The apparatus case 3 is formed in a substantially rectangular shape.

The apparatus case 3 is provided with an apparatus-side tape inlet 7, an apparatus-side tape outlet 9, a tape introduction path 11, a tape discharge path 13, and a cartridge mounting portion 15.

The apparatus-side tape inlet 7 is provided on a surface of the apparatus case 3 in the +X direction, and is formed in a substantially rectangular shape elongated in the Z-axis direction. The apparatus-side tape inlet 7 introduces the tape T fed from a tape roll (not illustrated) set outside the apparatus case 3 into the apparatus case 3. That is, the tape T is introduced into the apparatus case 3 through the apparatus-side tape inlet 7 in a posture in which the width direction of the tape T is the Z-axis direction.

The apparatus-side tape outlet 9 is provided on a surface of the apparatus case 3 in the −X direction, and is formed in a substantially rectangular shape elongated in the Z-axis direction. The apparatus-side tape outlet 9 discharges the tape T introduced into the apparatus case 3 to an outside of the apparatus case 3. That is, the tape T is discharged to the outside of the apparatus case 3 through the apparatus-side tape outlet 9 in a posture in which the width direction of the tape T is the Z-axis direction.

The tape introduction path 11 is a path from the apparatus-side tape inlet 7 to the cartridge mounting portion 15. The tape T introduced from the apparatus-side tape inlet 7 into the apparatus case 3 is fed to the ribbon cartridge 101A mounted on the cartridge mounting portion 15, through the tape introduction path 11.

The tape discharge path 13 is a path from the cartridge mounting portion 15 to the apparatus-side tape outlet 9. The tape T discharged from the ribbon cartridge 101A mounted on the cartridge mounting portion 15 is discharged from the apparatus-side tape outlet 9 to the outside of the apparatus case 3 through the tape discharge path 13.

The cartridge mounting portion 15 is a recess portion that is opened in the +Z direction. The ribbon cartridge 101A is detachably mounted in the cartridge mounting portion 15.

The apparatus-side tape inlet 7, the apparatus-side tape outlet 9, the tape introduction path 11, and the tape discharge path 13 are open in the +Z direction, in the same manner as the cartridge mounting portion 15. Therefore, when mounting the ribbon cartridge 101A in which the tape T is introduced in advance into the cartridge mounting portion 15, a user can insert the tape T projecting from the ribbon cartridge 101A into the apparatus-side tape inlet 7, the apparatus-side tape outlet 9, the tape introduction path 11, and the tape discharge path 13 from the +Z direction.

The mounting portion cover 5 is rotatably attached to an end portion of the apparatus case 3 in the +Y direction. The mounting portion cover 5 opens and closes the apparatus-side tape inlet 7, the apparatus-side tape outlet 9, the tape introduction path 11, the tape discharge path 13, and the cartridge mounting portion 15 in the +Z direction. In FIG. 4, the mounting portion cover 5 is not illustrated.

The cartridge mounting portion 15 is provided with the thermal head 17 and the head cover 19. The thermal head 17 includes a heat generating element (not illustrated), and performs printing on the tape T. The head cover 19 partially covers the thermal head 17. When the ribbon cartridge 101A is mounted on the cartridge mounting portion 15, the thermal head 17 and the head cover 19 are inserted into the head insertion hole 121.

From a bottom surface of the cartridge mounting portion 15, a platen shaft 21, a feeding shaft 23, and a winding shaft 25 project in the +Z direction. When the ribbon cartridge 101A is mounted on the cartridge mounting portion 15, the platen shaft 21, the feeding shaft 23, and the winding shaft 25 are inserted into the platen roller 109, the feeding core 125, and the winding core 107, respectively. Therefore, rotation of a feed motor (not illustrated) can be transmitted to the platen roller 109, the feeding core 125, and the winding core 107.

Further, an entry projection 27 projects from the bottom surface of the cartridge mounting portion 15 in the +Z direction. When the ribbon cartridge 101A is mounted in the cartridge mounting portion 15, the entry projection 27 enters the cartridge case 103 from a projection insertion hole 127 illustrated in FIG. 2 provided in the cartridge case 103.

When the mounting portion cover 5 is closed after the ribbon cartridge 101A is mounted on the cartridge mounting portion 15, the thermal head 17 is moved toward the platen roller 109 by a head moving mechanism (not illustrated). Therefore, the tape T and the ink ribbon 123 are pinched between the thermal head 17 and the platen roller 109. When the platen roller 109 and the winding shaft 25 are rotated in this state, the tape T and the ink ribbon 123 are fed. At this time, the thermal head 17 generates heat based on print data received from an external apparatus such as a personal computer, and therefore, an ink of the ink ribbon 123 is transferred to the tape T, and a printing image is printed on the tape T.

A cutter 29 is provided between the cartridge mounting portion 15 and the apparatus-side tape outlet 9. The cutter 29 cuts the tape T by using a cutter motor (not illustrated) as a driving source. Therefore, a printed portion of the tape T is cut away.

A substrate connecting portion 31 is provided on an inner surface of the cartridge mounting portion 15. When the ribbon cartridge 101A is mounted on the cartridge mounting portion 15, the substrate connecting portion 31 comes into contact with the circuit substrate 113 attached to the cartridge case 103. Therefore, the circuit substrate 113 and a control portion (not illustrated) included in the tape printing apparatus 1 are electrically connected to each other, via the substrate connecting portion 31. The control portion reads various types of information stored in the circuit substrate 113, and writes various types of information in the circuit substrate 113 via the substrate connecting portion 31.

Cartridge Case

The cartridge case 103 will be described with reference to FIG. 1 and FIG. 2. The cartridge case 103 includes a first case portion 129, and a second case portion 131 made of a member different from a member of the first case portion 129. The second case portion 131 is located in the +Z direction with respect to the first case portion 129. The ribbon cartridge 101A is mounted on the cartridge mounting portion 15 such that the first case portion 129 faces the bottom surface of the cartridge mounting portion 15.

The second case portion 131 includes a second A case portion 133, a second B case portion 135, and a second C case portion 137. The second A case portion 133, the second B case portion 135, and the second C case portion 137 are made of members different from each other. That is, the second case portion 131 is made of three members of the second A case portion 133, the second B case portion 135, and the second C case portion 137. The first case portion 129 is made of a non-transmissive resin, and all of the second A case portion 133, the second B case portion 135, and the second C case portion 137 forming the second case portion 131 are made of a transmissive resin. Meanwhile, the material of each case portion is not limited thereto.

The first case portion 129 and the second A case portion 133 form an outer shell of a tape presser accommodating portion 139. The tape pressing portion 111 is accommodated in the tape presser accommodating portion 139. The first case portion 129 and the second B case portion 135 form an outer shell of an ink ribbon accommodating portion 141. The ribbon roll 105 and the winding core 107 are accommodated in the ink ribbon accommodating portion 141. The first case portion 129 and the second C case portion 137 form an outer shell of a platen roller accommodating portion 143. The platen roller 109 is accommodated in the platen roller accommodating portion 143.

First Case Portion

The first case portion 129 will be described with reference to FIG. 2. The first case portion 129 includes a first base wall portion 145 formed in a plate shape parallel to an XY plane and a first side wall portion 147 projecting from a peripheral edge portion of the first base wall portion 145 in the +Z direction.

The first side wall portion 147 includes a first introduction-side side wall portion 149, a first discharge-side side wall portion 151, a first pressing-side side wall portion 153, and a first ribbon-side side wall portion 155. The first introduction-side side wall portion 149 is a wall portion located in the first side wall portion 147 in the +X direction. The first discharge-side side wall portion 151 is a wall portion located in the first side wall portion 147 in the −X direction. The first pressing-side side wall portion 153 is a wall portion located in the first side wall portion 147 in the +Y direction. The first ribbon-side side wall portion 155 is a wall portion located in the first side wall portion 147 in the −Y direction.

The first side wall portion 147 is provided with a first inlet portion 157, a side wall projection portion 161, and a substrate attaching portion 163.

The first inlet portion 157 is provided in the first introduction-side side wall portion 149, and is formed in a slit shape extending in the Z-axis direction. The first inlet portion 157 forms a part of the cartridge-side tape inlet 115.

The side wall projection portion 161 is provided at an edge portion of the first inlet portion 157 in the −Y direction, and is formed in a substantially prismatic shape projecting in the +Z direction from an end surface of the first introduction-side side wall portion 149 in the +Z direction. The substrate attaching portion 163 is provided at an end portion of the first introduction-side side wall portion 149 in the +Y direction. The circuit substrate 113 is attached to the substrate attaching portion 163.

The first base wall portion 145 is provided with a first head opening 165 located at a corner portion of the first base wall portion 145 in the −X direction and the −Y direction. The first head opening 165 is formed in a substantially rectangular shape, and forms an end portion of the head insertion hole 121 in the −Z direction.

A cylindrical portion 167, a tape pressing support shaft 169, a holding portion 171, a first projection portion 173, a ribbon guide 175, a first tape guide 177, a second tape guide 179, and a support projection portion 181 are provided from the first base wall portion 145 in the +Z direction.

Figure 11:
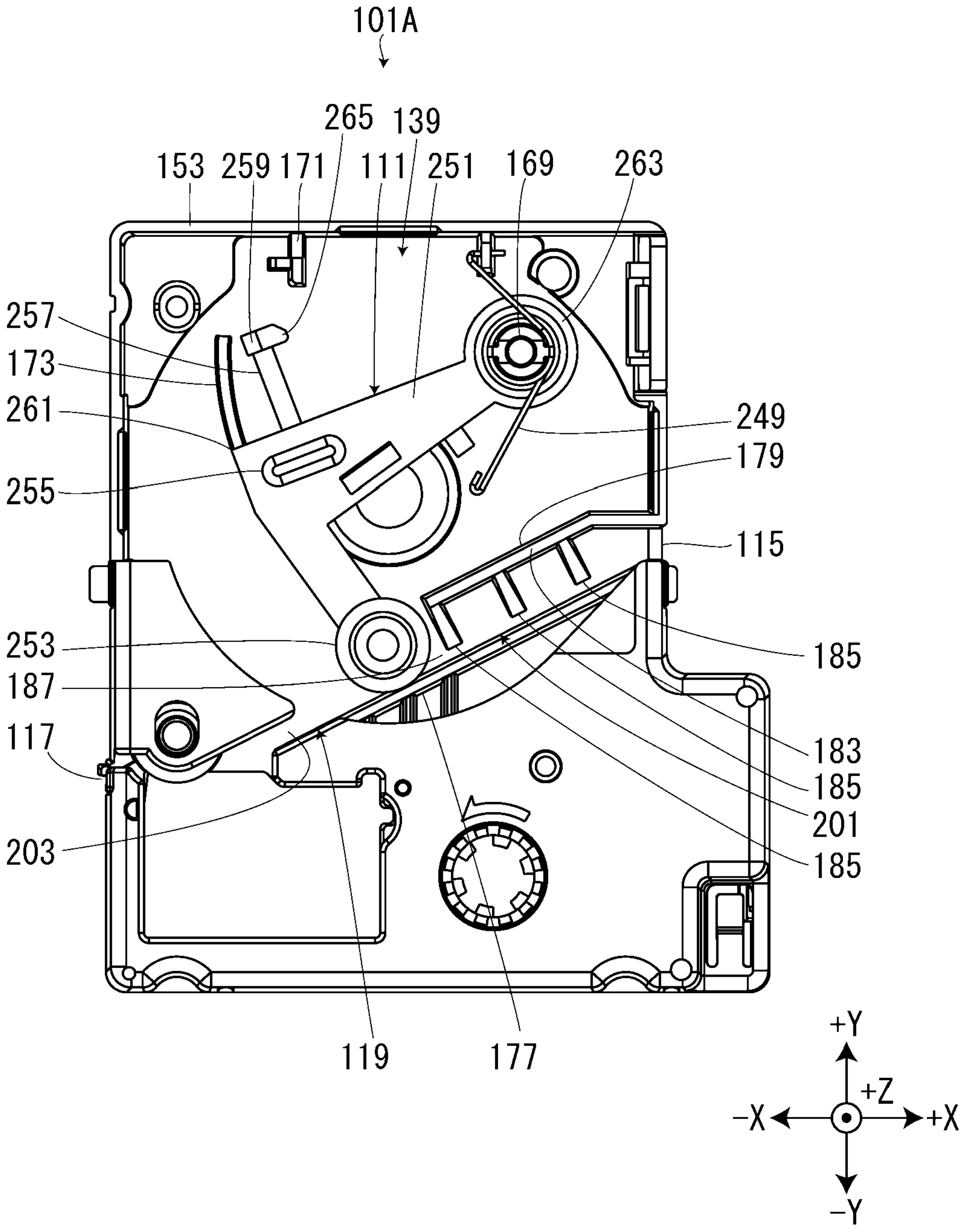
FIG. 11 is a view of the ribbon cartridge in a state in which the second A case portion is removed from a first case portion and a tape pressing portion is located at a pressing position, as viewed from the +Z direction.
Figure 12:
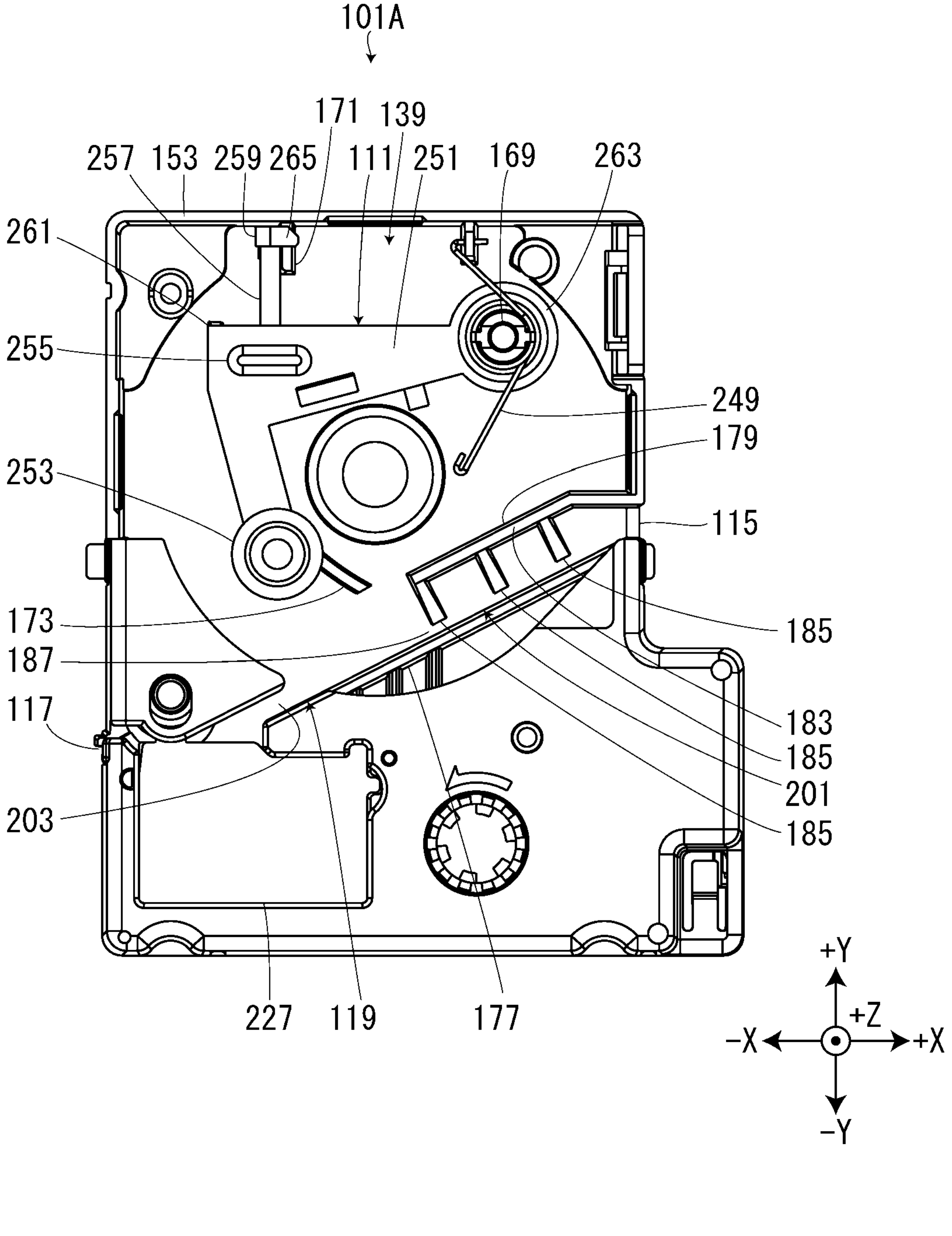
FIG. 12 is a view of the ribbon cartridge in a state in which the second A case portion is removed from the first case portion and the tape pressing portion is located at a separation position, as viewed from the +Z direction.

The cylindrical portion 167, the tape pressing support shaft 169, the holding portion 171, and the first projection portion 173 are provided in the tape presser accommodating portion 139. The cylindrical portion 167 is provided at a substantially center portion of the tape presser accommodating portion 139 when viewed from the +Z direction. The cylindrical portion 167 is provided with the projection insertion hole 127 described above. When the ribbon cartridge 101A is mounted in the cartridge mounting portion 15, the entry projection 27 provided in the cartridge mounting portion 15 enters the tape presser accommodating portion 139 through the projection insertion hole 127. The tape pressing support shaft 169 is provided in the +X direction and the +Y direction with respect to the cylindrical portion 167. The tape pressing support shaft 169 rotatably supports the tape pressing portion 111. The holding portion 171 is provided at an end portion of the first base wall portion 145 in the +Y direction. The holding portion 171 holds the tape pressing portion 111 at a position separated from the first tape guide 177. As illustrated in FIGS. 11 and 12, the first projection portion 173 is formed in a substantially arc shape centered on the tape pressing support shaft 169 when viewed from the +Z direction.

The ribbon guide 175 is provided at a peripheral edge portion of the first head opening 165. The ribbon guide 175 is formed in a substantially square tubular shape, and forms a peripheral wall of the head insertion hole 121. The ribbon guide 175 guides the feed of the ink ribbon 123 such that the ink ribbon 123 fed from the ribbon roll 105 revolves around the head insertion hole 121.

The first tape guide 177 and the second tape guide 179 are provided between the tape presser accommodating portion 139 and the ink ribbon accommodating portion 141. The first tape guide 177 extends between the first inlet portion 157 and the first head opening 165 in an oblique direction between the −X direction and the −Y direction.

As illustrated in FIGS. 11 and 12, the second tape guide 179 is provided in the +Y direction with respect to the first tape guide 177. The second tape guide 179 is provided with a guide base portion 183 and three guide projection portions 185. The guide base portion 183 is provided substantially parallel to the first tape guide 177 from the first inlet portion 157 to the path intermediate portion 187. The path intermediate portion 187 means an intermediate point between the first inlet portion 157 and the first head opening 165. The three guide projection portions 185 project from the guide base portion 183 toward the first tape guide 177.

The tape T introduced from the cartridge-side tape inlet 115 passes between the first tape guide 177 and the second tape guide 179, and more specifically, is fed to the platen roller 109 through a space between the first tape guide 177 and the three guide projection portions 185. The first tape guide 177 and the second tape guide 179 form a side wall of the tape path 119. That is, the first tape guide 177 and the second tape guide 179 guide the tape T introduced from the cartridge-side tape inlet 115 in a posture in which the width direction of the tape T is the Z-axis direction, in the thickness direction of the tape T.

A surface of each guide projection portion 185 in the +Z direction is formed to be an inclined surface such that a tip portion, that is, an end portion on the first tape guide 177 side is located in the −Z direction with respect to a base end portion, that is, an end portion on the guide base portion 183 side. Therefore, when the user inserts the tape T into the tape path 119 from the +Z direction in a state in which the tape path 119 is opened in the +Z direction, even when an end portion of the tape T in the −Z direction hits a surface of the guide projection portion 185 in the +Z direction, the tape T is guided between the first tape guide 177 and the three guide projection portions 185. Therefore, when the user inserts the tape T into the tape path 119 from the +Z direction, the tape T can be prevented from being caught on the guide projection portion 185.

As described above, the guide base portion 183 of the second tape guide 179 is provided between the first inlet portion 157 and the path intermediate portion 187. Therefore, a portion of the first tape guide 177, which is on the first inlet portion 157 side with respect to the path intermediate portion 187 faces the second tape guide 179. Meanwhile, a portion of the first tape guide 177, which is on the portion on the first head opening 165 side with respect to the path intermediate portion 187 does not face the second tape guide 179, but faces the tape pressing portion 111. That is, the first tape guide 177 also functions as a receiver of the tape pressing portion 111.

The support projection portion 181 is provided in the vicinity of the platen roller 109. The support projection portion 181 is engaged with the second C case portion 137, and supports the second C case portion 137.

The first case portion 129 is provided with three third engagement receiving portions 189, five first B engagement holes 191, and four first C engagement holes 193.

The three engagement receiving portions 189 are provided one by one at the first introduction-side side wall portion 149, the first discharge-side side wall portion 151, and the first pressing-side side wall portion 153, corresponding to positions at which the second A case portion 133 is combined with the first case portion 129. The three engagement receiving portions 189 are engaged with three second A engagement projection portions 219 provided in the second A case portion 133 illustrated in FIG. 6. Therefore, the second A case portion 133 is detachably combined with the first case portion 129.

Figure 9:
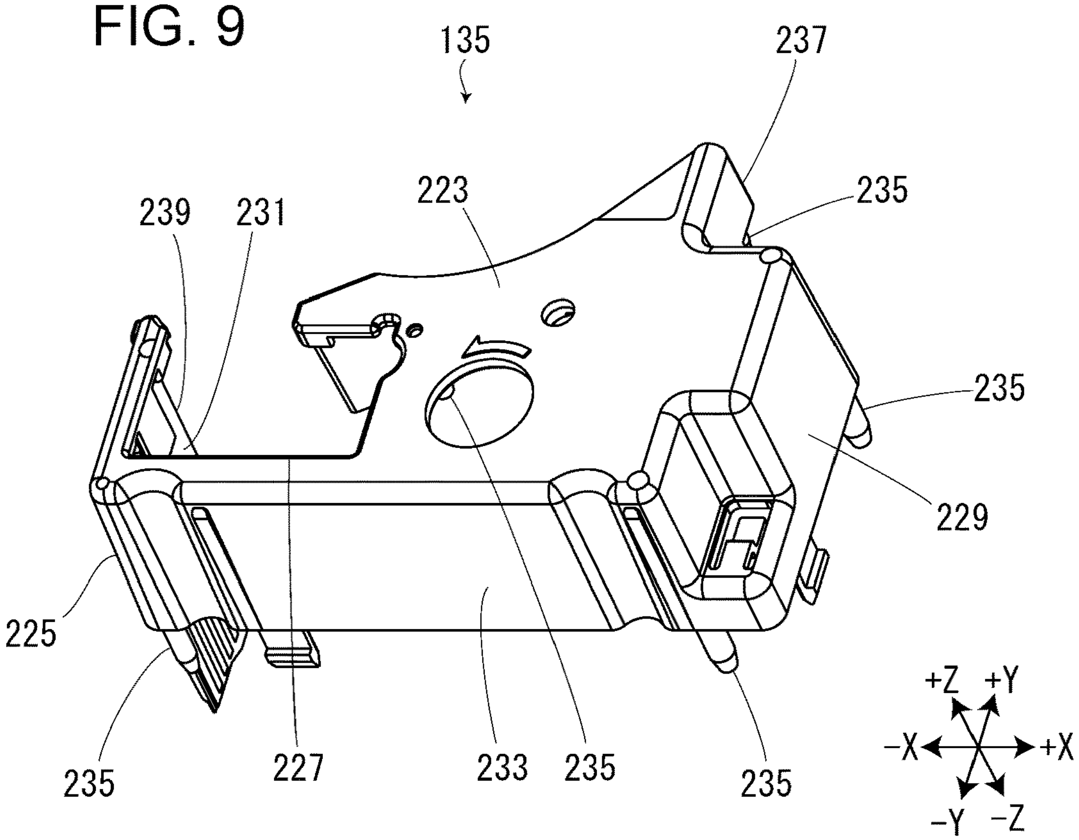
FIG. 9 is a perspective view of a second B case portion.

The five first B engagement holes 191 are provided corresponding to positions at which the second B case portion 135 is combined with the first case portion 129. Among the five first B engagement holes 191, four first B engagement holes 191 are provided in the first side wall portion 147 and one first B engagement hole 191 is provided in the ribbon guide 175. Among the four first B engagement holes 191 provided in the first side wall portion 147, one first B engagement hole 191 is provided on an end surface of the side wall projection portion 161 in the +Z direction. The five first B engagement holes 191 extend in the Z-axis direction. As illustrated in FIG. 9, five second B engagement pins 235 provided in the second B case portion 135 are press-fitted into the five first B engagement holes 191 from the +Z direction. Therefore, the second B case portion 135 is combined with the first case portion 129. The second B engagement pin 235 and the first B engagement hole 191 into which the second B engagement pin 235 is press-fitted are referred to as a case engagement portion 195. The first case portion 129 and the second B case portion 135 are combined by five case engagement portions 195.

Figure 5:
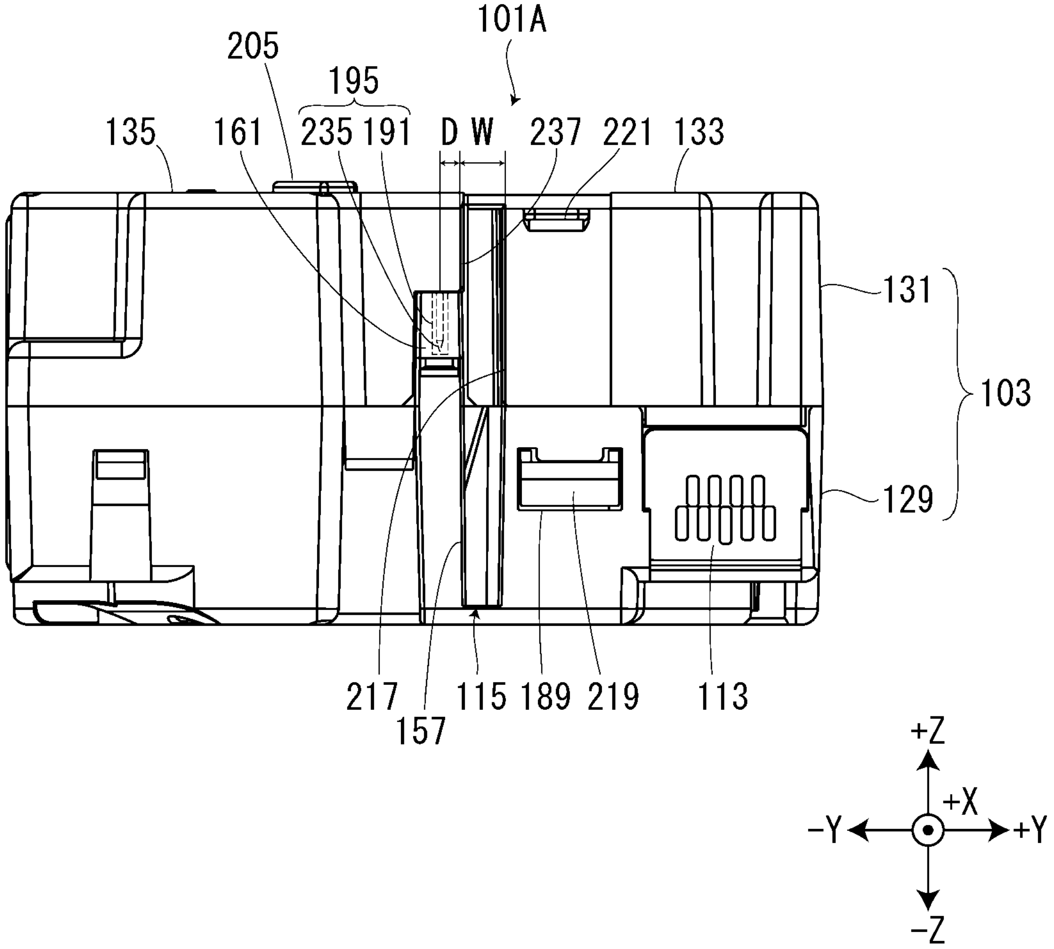
FIG. 5 is a view of the ribbon cartridge viewed from a +X direction.

As illustrated in FIG. 5, among the five case engagement portions 195, the case engagement portion 195 constituting the first B engagement hole 191 provided in the side wall projection portion 161 and the second B engagement pin 235 press-fitted to the first B engagement hole 191 is provided at a position at which a distance D from the cartridge-side tape inlet 115 is smaller than a dimension W of the cartridge-side tape inlet 115 in a lateral direction of the cartridge-side tape inlet 115, that is, the Y-axis direction. Therefore, unlike the present embodiment, even with the case engagement portion 195 closest to the cartridge-side tape inlet 115, it is possible to prevent a decrease in rigidity of the cartridge case 103 due to the provision of the cartridge-side tape inlet 115, as compared to a configuration in which the case engagement portion 195 is provided at a position at which the distance D from the cartridge-side tape inlet 115 is larger than the dimension W of the cartridge-side tape inlet 115. Here, the distance D between the case engagement portion 195 and the cartridge-side tape inlet 115 means a dimension between a center of the case engagement portion 195 in the Y-axis direction and an end portion of the cartridge-side tape inlet 115 in the −Y direction, that is, a second B introduction edge portion 237, which will be described below.

In the present embodiment, the case engagement portion 195 provided at the position at which the distance D from the cartridge-side tape inlet 115 is smaller than the dimension W of the cartridge-side tape inlet 115 is the case engagement portion 195 constituting the first B engagement hole 191 provided on the side wall projection portion 161 and the second B engagement pin 235 press-fitted to the first B engagement hole 191. Meanwhile, the present embodiment is not limited thereto. For example, the case engagement portion 195 provided at the position at which the distance D from the cartridge-side tape inlet 115 is smaller than the dimension W of the cartridge-side tape inlet 115 may be the case engagement portion 195 constituting the first B engagement hole 191 provided on the first side wall portion 147 other than the side wall projection portion 161 and the second B engagement pin 235 press-fitted to the first B engagement hole 191.

Figure 10:
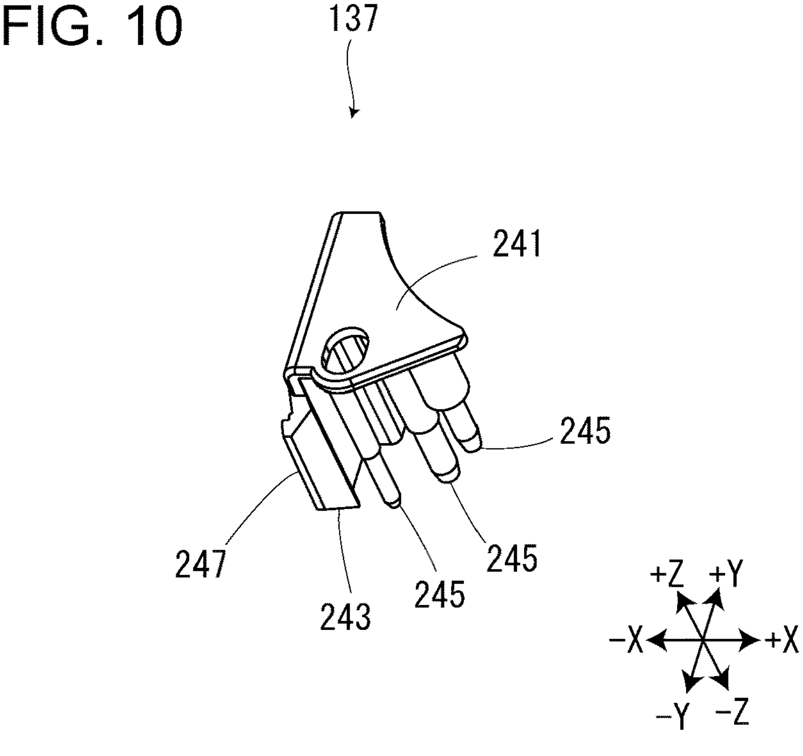
FIG. 10 is a perspective view of a second C case portion.

The four first C engagement holes 193 are provided corresponding to positions at which the second C case portion 137 is combined with the first case portion 129. Among the four first C engagement holes 193, three first C engagement holes 193 are provided at the first side wall portion 147 and one first C engagement hole 193 is provided at the support projection portion 181. The four first C engagement holes 193 extend in the Z-axis direction. As illustrated in FIG. 10, four second C engagement pins 245 provided in the second C case portion 137 are press-fitted into the four first C engagement holes 193 from the +Z direction. Therefore, the second C case portion 137 is combined with the first case portion 129.

Second A Case Portion

Figure 6:
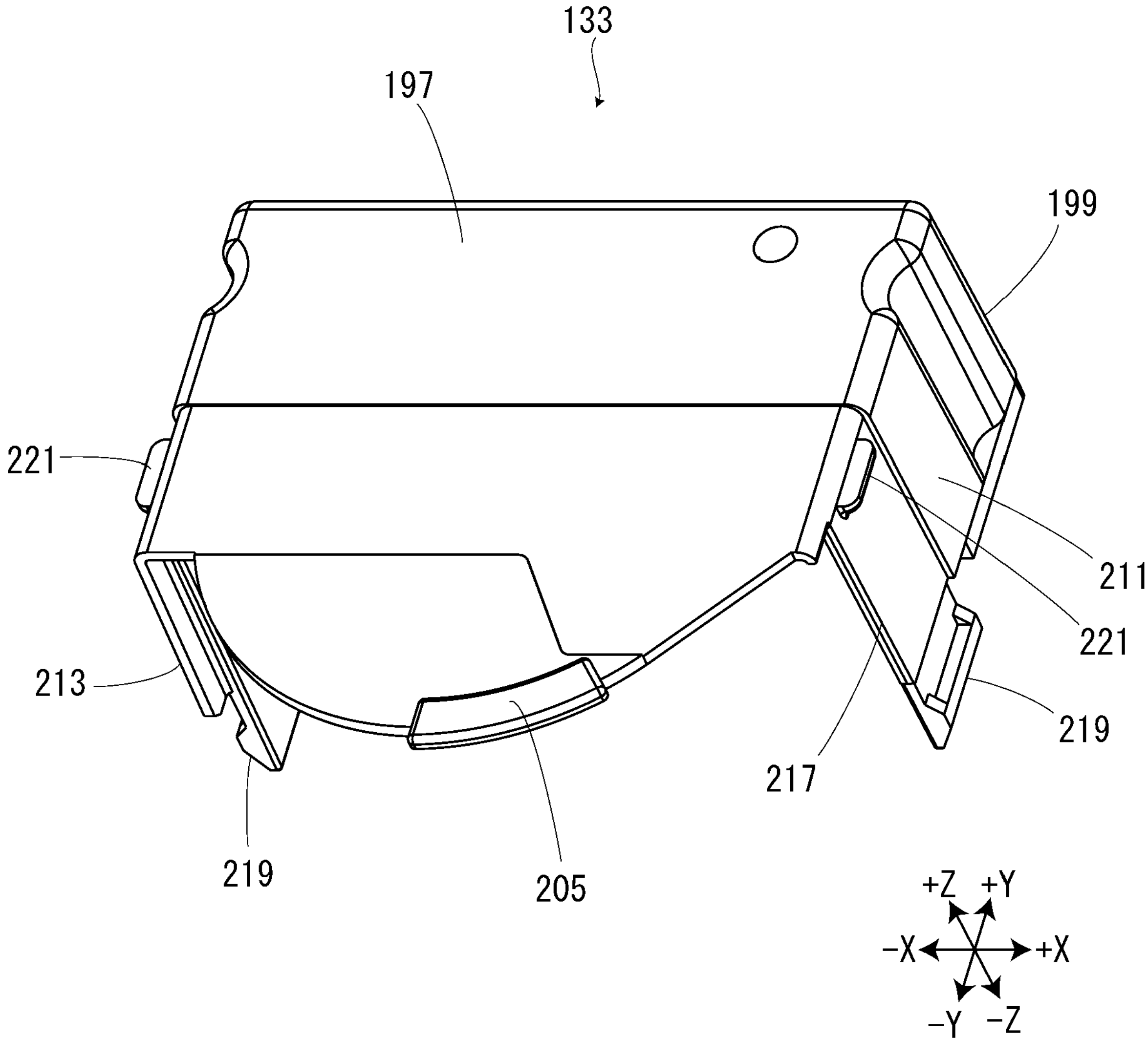
FIG. 6 is a perspective view of a second A case portion.
Figure 7:
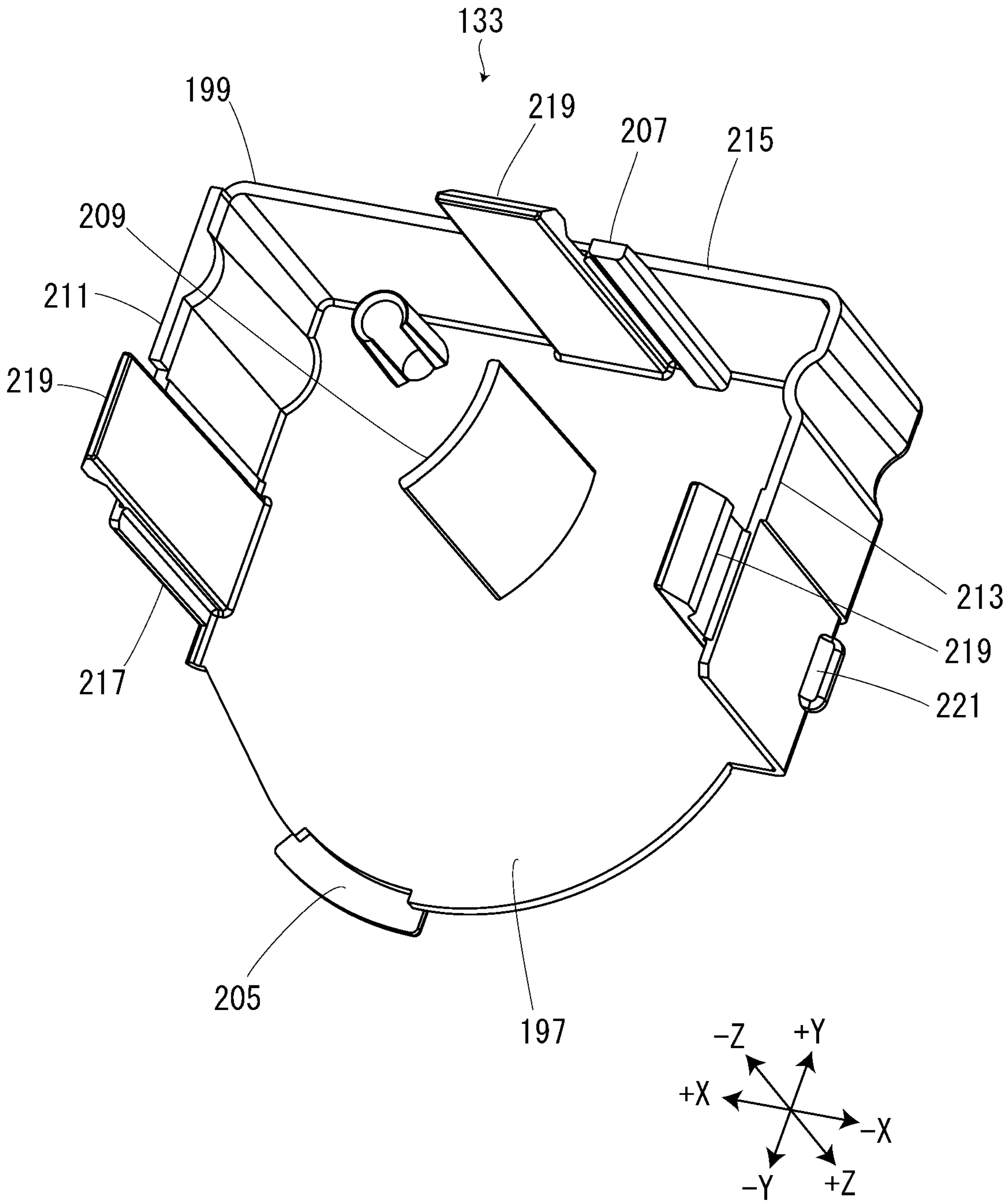
FIG. 7 is a perspective view of the second A case portion viewed from an angle different from an angle of FIG. 6.

The second A case portion 133 will be described with reference to FIGS. 6 and 7. The second A case portion 133 includes a second A base wall portion 197 formed in a plate shape parallel to the XY plane and a second A side wall portion 199 projecting from a peripheral edge portion of the second A base wall portion 197 in the −Z direction.

When the second A case portion 133 is mounted on the first case portion 129, the second A base wall portion 197 covers the tape presser accommodating portion 139 and a first path 201 in the +Z direction. Here, the first path 201 means a section of the tape path 119 from the cartridge-side tape inlet 115 to the middle of the tape path 119. In the present embodiment, as illustrated in FIGS. 11 and 12, the first path 201 corresponds to a section of the tape path 119, which is from the cartridge-side tape inlet 115 to a front of a case opening 203 provided between the second B case portion 135 and the second C case portion 137, that is, to an end portion of the case opening 203 on the cartridge-side tape inlet 115 side. The first path 201 has a length equal to or more than half a length of the tape path 119, more specifically, a length of approximately two thirds of the tape path 119.

Figure 8:
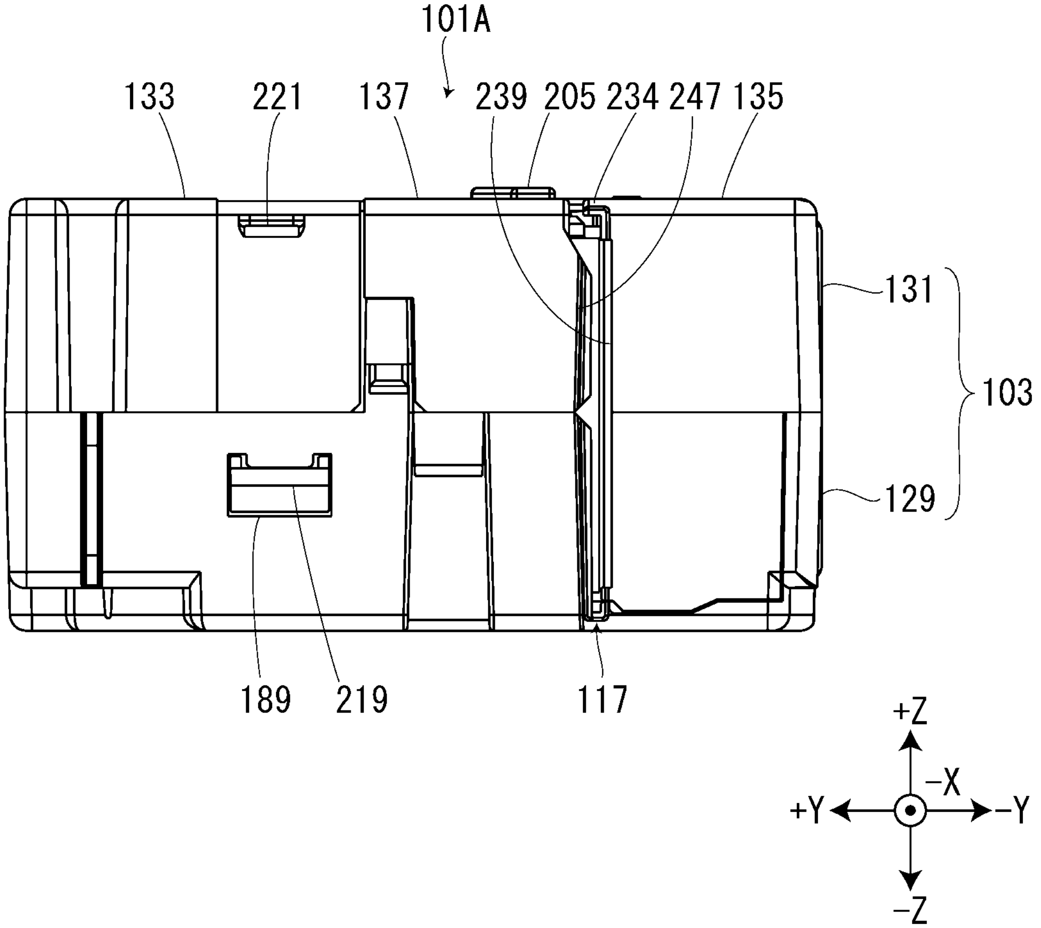
FIG. 8 is a view of the ribbon cartridge viewed from a –X direction.

An overlap portion 205 is provided at an edge portion of the second A base wall portion 197 in the −Y direction. The overlap portion 205 is provided in the +Z direction with respect to the second A base wall portion 197. As illustrated in FIGS. 5 and 8, when the second A case portion 133 is mounted on the first case portion 129, the overlap portion 205 overlaps with an outside of the second B case portion 135, that is, in the +Z direction. Since the overlap portion 205 is provided in the second A base wall portion 197, even when a force is applied to the second A base wall portion 197 from the outside, the overlap portion 205 is supported by the second B case portion 135 from the inside, that is, from the −Z direction, so that it is possible to prevent the second A base wall portion 197 from bending inward.

A release portion 207 and a second projection portion 209 project from the second A base wall portion 197 in the −Z direction. The release portion 207 is formed in a substantially prismatic shape, and is engaged with the tape pressing portion 111 at a tip portion of the release portion 207 when the second A case portion 133 is mounted on the first case portion 129. The second projection portion 209 is formed in a substantially arc shape centered on the tape pressing support shaft 169 when viewed from the +Z direction.

The second A side wall portion 199 includes a second A introduction-side side wall portion 211, a second A discharge-side side wall portion 213, and a second A pressing-side side wall portion 215. The second A introduction-side side wall portion 211 is a wall portion located in the second A side wall portion 199 in the +X direction. The second A discharge-side side wall portion 213 is a wall portion located in the second A side wall portion 199 in the −X direction. The second A pressing-side side wall portion 215 is a wall portion located in the second A side wall portion 199 in the +Y direction.

A second A introduction edge portion 217, which is an end portion of the second A introduction-side side wall portion 211 in the −Y direction, forms an edge portion of the cartridge-side tape inlet 115 in the +Y direction. That is, as illustrated in FIG. 5, the cartridge-side tape inlet 115 is provided between the second A introduction edge portion 217 of the second A case portion 133 and the second B introduction edge portion 237 of the second B case portion 135. In this manner, the cartridge-side tape inlet 115 can be configured by using a gap between the second A case portion 133 and the second B case portion 135.

The second A side wall portion 199 is provided with the three second A engagement projection portions 219 and two finger hook portions 221.

The three second A engagement projection portions 219 project one by one at the second A introduction-side side wall portion 211, the second A discharge-side side wall portion 213, and the second A pressing-side side wall portion 215 in the −Z direction. Each of the second A engagement projection portions 219 is formed to have a hook-shaped tip portion, and is engaged with the engagement receiving portion 189 provided in the first case portion 129. The three second A engagement projection portions 219 are engaged with the three engagement receiving portions 189, so that the second A case portion 133 is detachably combined with the first case portion 129.

The second A case portion 133 can open and close the tape presser accommodating portion 139 and the first path 201 in the +Z direction. That is, the second A case portion 133 opens the tape presser accommodating portion 139 and the first path 201 in the +Z direction by being removed from the first case portion 129, and closes the tape presser accommodating portion 139 and the first path 201 in the +Z direction by being mounted on the first case portion 129.

By opening the tape presser accommodating portion 139 in the +Z direction, the user can operate the tape pressing portion 111 from the +Z direction. In addition, by opening the first path 201 in the +Z direction, the user can insert the tape T from the +Z direction into the first path 201, that is, between the tape pressing portion 111 and the first tape guide 177.

On the other hand, since the second A case portion 133 closes the tape presser accommodating portion 139 and the first path 201 in the +Z direction, it is possible to prevent a foreign matter from entering the tape presser accommodating portion 139 and the first path 201. In addition, even when a defect occurs in the tape pressing portion 111 since the first path 201 is closed in the +Z direction by the second A case portion 133, when the ribbon cartridge 101A is to be mounted in the cartridge mounting portion 15, it is possible to prevent the movement of the tape T inserted in the tape path 119 in the Z-axis direction, that is, the width direction of the tape T. Therefore, the user can easily mount the ribbon cartridge 101A with the tape T inserted into the tape path 119 into the cartridge mounting portion 15.

In particular, in the present embodiment, since the second A case portion 133 closes the first path 201 in the +Z direction, which occupies half or more of the tape path 119, it is possible to more effectively prevent the movement of the tape T inserted into the tape path 119, in the width direction of the tape T. When the second A case portion 133 closes the first path 201 in the +Z direction, it is preferable that there is almost no gap between the second A case portion 133 and the second B case portion 135. That is, regarding the first path 201, it is preferable that the second A case portion 133 closes not only a part of the first path 201 in a width direction of the first path 201, that is, in the thickness direction of the tape T inserted into the first path 201 but also an entirety of the first path 201.

In the present embodiment, not only the first path 201 in the +Z direction including the cartridge-side tape inlet 115 but also a part of the cartridge-side tape outlet 117 in the +Z direction is closed by the outlet covering portion 234 illustrated in FIG. 8, which is provided in the second B case portion 135. With this configuration, it is possible to more effectively prevent the tape T inserted into the tape path 119 from being moved in the width direction of the tape T.

Of the two finger hook portions 221, one finger hook portion 221 projects in the +X direction from an end portion of the second A introduction-side side wall portion 211 in the −Y direction, and the other finger hook portion 221 projects in the −X direction from an end portion of the second A discharge-side side wall portion 213 in the −Y direction. The two finger hook portions 221 are portions on which the user hooks a finger when the user removes the second A case portion 133 from the first case portion 129.

The finger hook portion 221 is not limited to the configuration in which the finger hook portion 221 projects from the second A side wall portion 199, and may be a recess portion or may have a configuration in which a partial surface of the second A side wall portion 199 is roughened to make it difficult for the finger to slip.

Second B Case Portion

The second B case portion 135 will be described with reference to FIG. 9. The second B case portion 135 includes a second B base wall portion 223 formed in a plate shape parallel to the XY plane and a second B side wall portion 225 projecting from a peripheral edge portion of the second B base wall portion 223 in the −Z direction.

The second B base wall portion 223 is provided substantially flush with the second A base wall portion 197 when the second A case portion 133 is mounted on the first case portion 129, and the overlap portion 205 overlaps with the second B base wall portion 223 in the +Z direction. The second B base wall portion 223 is provided with a second head opening 227 located at a corner portion of the second B base wall portion 223 in the −X direction and the −Y direction. The second head opening 227 is formed in a substantially rectangular shape, and forms an end portion of the head insertion hole 121 in the +Z direction.

As illustrated in FIG. 12, the case opening 203 is provided between the second B base wall portion 223 and a second C base wall portion 241 of the second C case portion 137. The case opening 203 is located in the +Z direction with respect to the tape path 119. The case opening 203 is a location through which the tape T passes when the tape T is inserted into the tape path 119 in the −Z direction. In this manner, a gap between the second B case portion 135 and the second C case portion 137 can be used to form the case opening 203 through which the tape T passes when the tape T is inserted into the tape path 119. As illustrated in FIG. 12, an end portion of the case opening 203 in the −X direction and the −Y direction is connected to the second head opening 227.

The second B side wall portion 225 includes a second B introduction-side side wall portion 229, a second B discharge-side side wall portion 231, and a second B ribbon-side side wall portion 233. The second B introduction-side side wall portion 229 is a wall portion located in the second B side wall portion 225 in the +X direction. The second B discharge-side side wall portion 231 is a wall portion located in the second B side wall portion 225 in the −X direction. The second B ribbon-side side wall portion 233 is a wall portion located in the second B side wall portion 225 in the −Y direction.

The second B case portion 135 is provided with the five second B engagement pins 235. Among the five second B engagement pins 235, four second B engagement pins 235 project in the −Z direction from an end surface of the second B side wall portion 225 in the −Z direction, and one second B engagement pin 235 is located near the second head opening 227 and projects from the second B base wall portion 223 in the −Z direction. The five second B engagement pins 235 are press-fitted into the five first B engagement holes 191 provided in the first case portion 129, from the +Z direction. Therefore, the second B case portion 135 is combined with the first case portion 129.

The second B introduction edge portion 237, which is an end portion of the second B introduction-side side wall portion 229 in the +Y direction, forms an edge portion of the cartridge-side tape inlet 115 in the −Y direction. That is, as described above, the cartridge-side tape inlet 115 is provided between the second B introduction edge portion 237 of the second B case portion 135 and the second A introduction edge portion 217 of the second A case portion 133.

In addition, a second B discharge edge portion 239, which is an end portion of the second B discharge-side side wall portion 231 in the +Y direction, forms an edge portion of the cartridge-side tape outlet 117 in the −Y direction. That is, as illustrated in FIG. 8, the cartridge-side tape outlet 117 is provided between the second B discharge edge portion 239 of the second B case portion 135 and a second C discharge edge portion 247 of the second C case portion 137.

Second C Case Portion

The second C case portion 137 will be described with reference to FIG. 10. The second C case portion 137 includes a second C base wall portion 241 formed in a plate shape parallel to the XY plane and a second C side wall portion 243 projecting from a peripheral edge portion of the second C base wall portion 241 in the −Z direction.

The second C base wall portion 241 is provided substantially flush with the second A base wall portion 197 and the second C base wall portion 241 when the second A case portion 133 is mounted on the first case portion 129. As described above, the case opening 203 is provided between the second C base wall portion 241 and the second B base wall portion 223.

The second C case portion 137 is provided with the four second C engagement pins 245. Among the four second C engagement pins 245, three second C engagement pins 245 project in the −Z direction from an end surface of the second C side wall portion 243 in the −Z direction, and one second C engagement pin 245 projects in the −Z direction from the second C base wall portion 241. The four second C engagement pins 245 are press-fitted into the four first C engagement holes 193 provided in the first case portion 129, from the +Z direction. Therefore, the second C case portion 137 is combined with the first case portion 129.

The second C discharge edge portion 247, which is an end portion of the second C side wall portion 243 in the −Y direction, forms an edge portion of the cartridge-side tape outlet 117 in the +Y direction. That is, as described above, the cartridge-side tape outlet 117 is provided between the second C discharge edge portion 247 of the second C case portion 137 and the second B discharge edge portion 239 of the second B case portion 135.

Tape Pressing Portion

The tape pressing portion 111 will be described with reference to FIGS. 11 and 12. The tape pressing portion 111 is accommodated in the tape presser accommodating portion 139 to be movable between a separation position and s pressing position.

As illustrated in FIG. 11, the pressing position of the tape pressing portion 111 means a position at which the tape pressing portion 111 presses the tape T inserted into the tape path 119 against the first tape guide 177. As illustrated in FIG. 12, the separation position of the tape pressing portion 111 means a position at which the tape pressing portion 111 is separated from the tape T inserted into the tape path 119.

An elastic member 249 is accommodated in the tape presser accommodating portion 139 together with the tape pressing portion 111. The elastic member 249 applies a force to the tape pressing portion 111 in a direction in which the tape pressing portion 111 faces the pressing position, that is, to the tape pressing portion 111 counterclockwise when viewed from the +Z direction. Therefore, the tape pressing portion 111 can appropriately press the tape T by the elastic force of the elastic member 249. As the elastic member 249, for example, a torsion coil spring can be used. The elastic member 249 is provided at the tape pressing support shaft 169, one end portion of the elastic member 249 is latched to the tape pressing portion 111, and the other end portion of the elastic member 249 is latched to the first case portion 129.

The tape pressing portion 111 includes an arm portion 251, a tape contact portion 253, a pressing projection portion 255, an engagement support portion 257, and a pressing engagement portion 259.

The arm portion 251 is rotatably supported by the tape pressing support shaft 169 provided in the first case portion 129. When the arm portion 251 is rotated, the rotation of the arm portion 251 is guided by a surface of the arm portion 251 in the −Z direction being slid with the first projection portion 173. Further, when the arm portion 251 is rotated, the rotation of the arm portion 251 is guided by a surface of the arm portion 251 in the +Z direction being slid with the second projection portion 209. Therefore, blurring of the arm portion 251 in the Z-axis direction is prevented when the arm portion 251 is rotated, and the arm portion 251 can be smoothly rotated.

The arm portion 251 is formed in a shape bent in a substantially "L" shape when viewed from the +Z direction. A support shaft insertion portion 263 that is formed in a substantially disc shape is provided at an end portion of the arm portion 251 in the +X direction with respect to a bent portion 261. The tape pressing support shaft 169 is inserted through the support shaft insertion portion 263. The tape contact portion 253 is provided at an end portion of the arm portion 251 in the −Y direction with respect to the bent portion 261.

The tape contact portion 253 is formed in a substantially cylindrical shape, and comes into contact with the tape T when the tape pressing portion 111 is located at the pressing position. That is, when the tape pressing portion 111 is located at the pressing position, the tape T inserted into the tape path 119 is pinched between the tape contact portion 253 and the first tape guide 177.

The pressing projection portion 255 projects from the vicinity of the bent portion 261 of the arm portion 251 in the +Z direction. The pressing projection portion 255 is a portion on which the user hooks a finger when moving the tape pressing portion 111.

The engagement support portion 257 projects in a substantially columnar shape from the vicinity of the bent portion 261 of the arm portion 251 toward a side opposite to the tape contact portion 253. At a tip of the engagement support portion 257, the pressing engagement portion 259 is provided.

The pressing engagement portion 259 is provided at the tip of the engagement support portion 257. When the tape pressing portion 111 is moved to the separation position, the pressing engagement portion 259 is engaged with the holding portion 171 provided in the first case portion 129 from a side opposite to the tape pressing support shaft 169 with respect to the holding portion 171, that is, from the −X direction to enter between the holding portion 171 and the first pressing-side side wall portion 153. Therefore, the movement of the tape pressing portion 111 is blocked against the elastic force of the elastic member 249. That is, the tape pressing portion 111 is held at the separation position by engaging the pressing engagement portion 259 with the holding portion 171.

Figure 13:
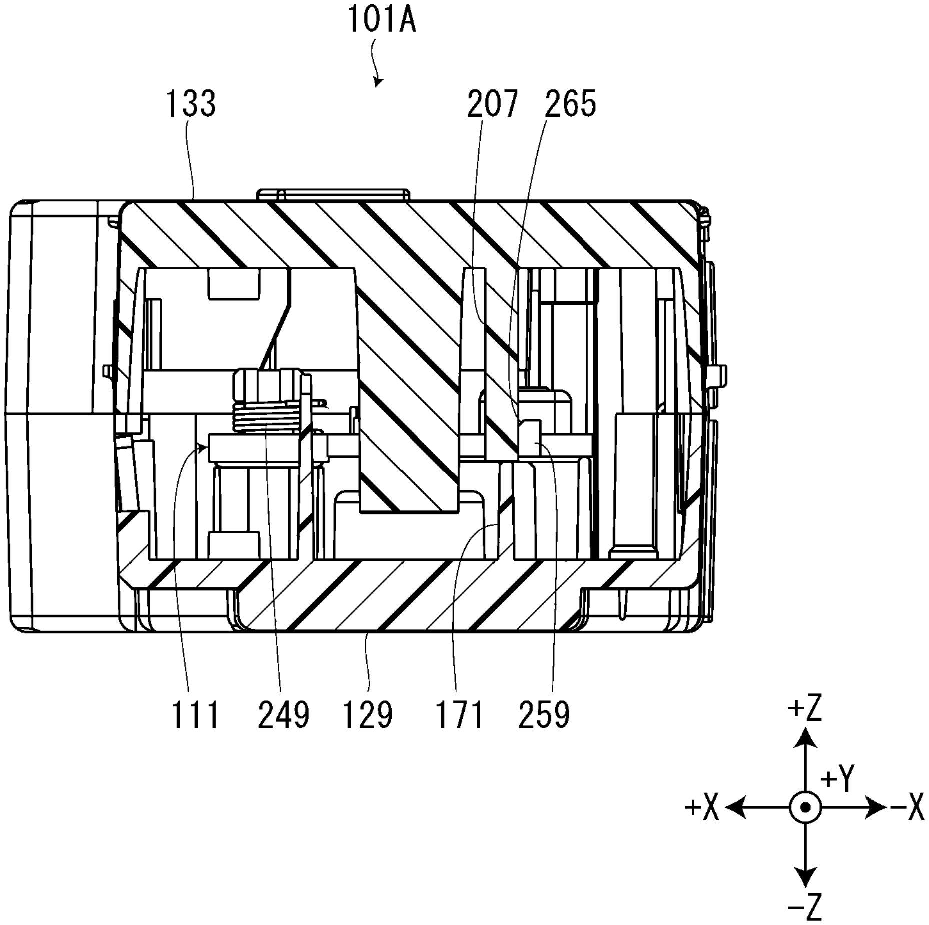
FIG. 13 is a cross-sectional diagram of the ribbon cartridge.

A release inclined surface 265 is provided on a surface of the pressing engagement portion 259 in the +Z direction. The release inclined surface 265 is inclined such that an end portion of the release inclined surface 265 in the +X direction is located in the −Z direction with respect to an end portion of the release inclined surface 265 in the −X direction. When the second A case portion 133 is mounted on the first case portion 129 in a state in which the pressing engagement portion 259 is engaged with the holding portion 171, the release portion 207 provided in the second A case portion 133 presses the release inclined surface 265 from the +Z direction, as illustrated in FIG. 13. Therefore, the release portion 207 is pressed in the −X direction and the pressing engagement portion 259 is displaced from the holding portion 171. Therefore, the tape pressing portion 111 is moved to the pressing position by the elastic force of the elastic member 249.

Procedure of Inserting Tape into Tape Path

A procedure in which a user inserts the tape T into the tape path 119 will be described with reference to FIGS. 11 to 15. First, as illustrated in FIG. 11, the user detaches the second A case portion 133 from the first case portion 129, and opens the tape presser accommodating portion 139 and the first path 201 in the +Z direction. At this time, the user can easily move the second A case portion 133 in the +Z direction with respect to the first case portion 129 by using the finger hook portion 221, and the second A case portion 133 can be easily detached from the first case portion 129.

Subsequently, as illustrated in FIG. 12, the user moves the tape pressing portion 111 to a separation position against the elastic force of the elastic member 249. At this time, the user can easily move the tape pressing portion 111 to the separation position by using the pressing projection portion 255.

When the tape pressing portion 111 is moved to the separation position, the pressing engagement portion 259 is engaged with the holding portion 171, so that the tape pressing portion 111 is held at the separation position. Therefore, when the user inserts the tape T into the tape path 119, it is not necessary to manually hold the tape pressing portion 111 such that the tape pressing portion 111 is located at the separation position, and operability can be improved.

Figure 14:
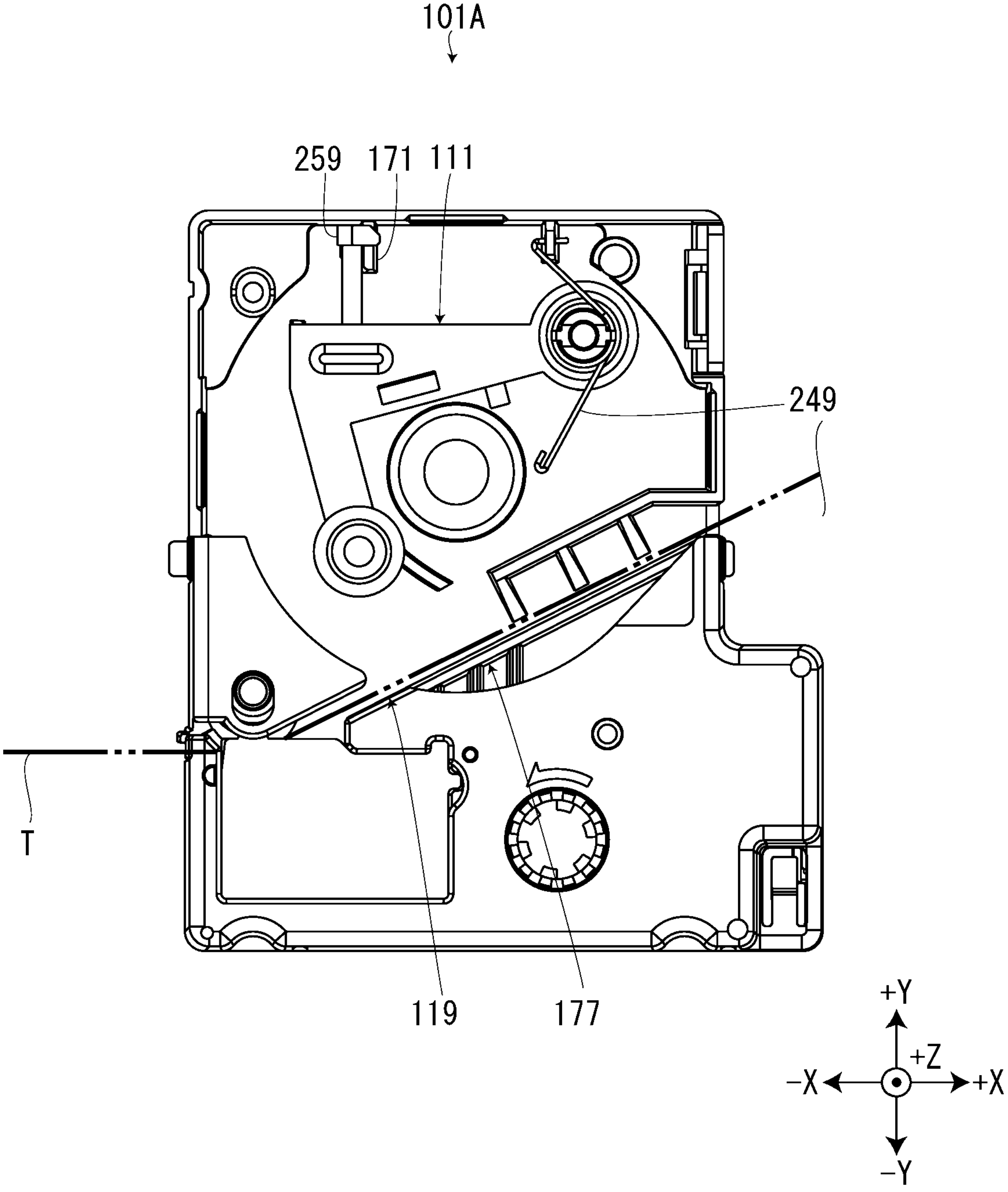
FIG. 14 is a view of the ribbon cartridge in a state in which the second A case portion is removed from the first case portion and a tape is inserted into a tape path, as viewed from the +Z direction.

Subsequently, as illustrated in FIG. 14, the user inserts the tape T pulled out from the tape roll from the +Z direction with respect to the tape path 119. At this time, since the tape pressing portion 111 is separated from the first tape guide 177, the user can easily insert the tape T between the tape pressing portion 111 and the first tape guide 177.

Subsequently, the user mounts the second A case portion 133 on the first case portion 129. At this time, as illustrated in FIG. 13, the release portion 207 provided in the second A case portion 133 is engaged with the pressing engagement portion 259. Therefore, the pressing engagement portion 259 is displaced from the holding portion 171, and the tape pressing portion 111 is moved to a pressing position by the elastic force of the elastic member 249. As illustrated in FIG. 15, the tape T inserted into the tape path 119 is pressed against the first tape guide 177 by the tape pressing portion 111 that has moved to the pressing position. Therefore, the user can release the holding of the tape pressing portion 111 by the holding portion 171, and can move the tape pressing portion 111 to the pressing position, without performing an operation for releasing the holding of the tape pressing portion 111 by the holding portion 171, apart from the operation of mounting the second A case portion 133 on the first case portion 129. In FIG. 15, in order to illustrate the tape pressing portion 111 and the tape path 119, the second A case portion 133 is transparently illustrated.

The user inserts the tape T into the tape path 119, and then mounts the ribbon cartridge 101A in the cartridge mounting portion 15. At this time, since the tape T inserted into the tape path 119 is pressed by the tape pressing portion 111, the tape T is prevented from coming out of the tape path 119 through the cartridge-side tape inlet 115. Therefore, the user can easily perform the operation of mounting the ribbon cartridge 101A at the cartridge mounting portion 15.

When the ribbon cartridge 101A is mounted in the cartridge mounting portion 15, the entry projection 27 that has entered the tape presser accommodating portion 139 from the projection insertion hole 127 is engaged with the arm portion 251, so that the tape pressing portion 111 is rotated in a direction in which the tape pressing portion 111 is moved toward the separation position. Therefore, since the tape pressing portion 111 is separated from the tape T, it is possible to prevent the feeding of the tape T from being interrupted by the tape pressing portion 111. In this manner, even when the user does not operate the tape pressing portion 111, the tape pressing portion 111 can be automatically separated from the tape T only by mounting the ribbon cartridge 101A in the cartridge mounting portion 15.

Second Embodiment

A ribbon cartridge 101B, which is a second embodiment of the ribbon cartridge, will be described with reference to FIGS. 16 and 17. In addition, in FIGS. 16 and 17, the second B case portion 135, the second C case portion 137, the ribbon roll 105, the winding core 107, and the platen roller 109 are not illustrated. The ribbon cartridge 101B is different from the ribbon cartridge 101A in that a hinge portion 267 and a connecting portion 269 are provided.

The hinge portion 267 has a rotation axis parallel to the X-axis direction, and connects an end portion of the first pressing-side side wall portion 153 in the +Z direction and an end portion of the second A pressing-side side wall portion 215 in the −Z direction such that the second A case portion 133 can be rotated with respect to the first case portion 129. That is, the second A case portion 133 is connected to the first case portion 129 via the hinge portion 267. In the ribbon cartridge 101B, it is not necessary to provide the engagement receiving portion 189 and the second A engagement projection portion 219 at the first pressing-side side wall portion 153 and the second A pressing-side side wall portion 215, respectively.

The second A case portion 133 opens the tape presser accommodating portion 139 and the first path 201 in the +Z direction, by being rotated in a first rotation direction with respect to the first case portion 129 around the hinge portion 267, that is, in a counterclockwise direction when viewed from the −X direction. The second A case portion 133 closes the tape presser accommodating portion 139 and the first path 201 in the +Z direction, by being rotated in a direction opposite to the first rotation direction with respect to the first case portion 129 around the hinge portion 267, that is, in a clockwise direction when viewed from the −X direction. In the ribbon cartridge 101B as well, the second A case portion 133 may be provided with the two finger hook portions 221. Therefore, the user can easily perform an operation of rotating the second A case portion 133 with respect to the first case portion 129.

The connecting portion 269 connects the tape pressing portion 111 and the second A case portion 133. A pressing-side coupling engagement portion 271 is provided on a surface of the arm portion 251 in the +Z direction, and a case-side coupling engagement portion 273 is provided at the second A pressing-side side wall portion 215. The pressing-side coupling engagement portion 271 is engaged with an end portion of the connecting portion 269 in the −Y direction, and the case-side coupling engagement portion 273 is engaged with an end portion of the connecting portion 269 in the +Y direction.

Since the tape pressing portion 111 is connected to the second A case portion 133 via the connecting portion 269, when the second A case portion 133 is rotated in the first rotation direction, in conjunction with the rotation of the second A case portion 133, the tape pressing portion 111 is moved to the separation position, as illustrated in FIG. 16. Therefore, the user can move the tape pressing portion 111 to the separation position without performing an operation of moving the tape pressing portion 111 to the separation position, apart from the operation of rotating the second A case portion 133 with respect to the first case portion 129.

When the second A case portion 133 is rotated in a second rotation direction, as illustrated in FIG. 17, the tape pressing portion 111 is moved to a pressing position in conjunction with the rotation of the second A case portion 133. Therefore, the user can move the tape pressing portion 111 to the pressing position without performing an operation of moving the tape pressing portion 111 to the pressing position, apart from the operation of rotating the second A case portion 133 with respect to the first case portion 129. The second A case portion 133 is applied with a force in the second rotation direction by the elastic force of the elastic member 249 via the tape pressing portion 111 and the connecting portion 269.

As described above, the ribbon cartridge 101A and the ribbon cartridge 101B of the present embodiment include the ink ribbon 123 and the cartridge case 103 accommodating the ink ribbon 123, and can be mounted on the tape printing apparatus 1. The cartridge case 103 includes the first case portion 129, and the second case portion 131 provided in the +Z direction with respect to the first case portion 129. The cartridge case 103 is provided with a cartridge-side tape inlet 115, and a cartridge-side tape outlet 117. The cartridge-side tape inlet 115 is formed in a long shape in a direction parallel to the +Z direction, and introduces the tape T from the outside of the cartridge case 103 into the cartridge case 103. The cartridge-side tape outlet 117 discharges the tape T introduced into the cartridge case 103 to the outside of the cartridge case 103. The first case portion 129 and the second case portion 131 are combined by a plurality of case engagement portions 195. The case engagement portion 195 includes the second B engagement pin 235 provided in the second case portion 131 and the first B engagement hole 191 provided in the first case portion 129 and engaged with the second B engagement pin 235. The cartridge-side tape inlet 115 is provided at a position at which the distance D from one case engagement portion 195 among the plurality of case engagement portions 195 is smaller than the dimension W of the cartridge-side tape inlet 115 in the lateral direction of the cartridge-side tape inlet 115.

With this configuration, it is possible to prevent a decrease in rigidity of the cartridge case 103 due to the provision of the cartridge-side tape inlet 115. Therefore, it is possible to prevent the cartridge case 103 from being bent or a part of the cartridge case 103 from being deformed.

Other Modification Examples

It is needless to say that the present disclosure is not limited to the above-described embodiment, and various configurations can be adopted without departing from the gist thereof. For example, the above-described embodiment can be changed to the following aspects in addition to the above-described aspects. In addition, a configuration in which the embodiments and modification examples are respectively combined may be used.

The ribbon cartridge 101A may not include the tape pressing portion 111. In this case, another component may be accommodated in a space corresponding to the tape presser accommodating portion 139, and no component in particular may be accommodated. The same manner is applied to the ribbon cartridge 101B.

The case engagement portion 195 is not limited to the configuration in which the engagement pin is provided in the second case portion 131 in the same manner as the second B engagement pin 235, and the engagement hole is provided in the first case portion 129 in the same manner as the first B engagement hole 191. For example, the case engagement portion 195 may have a configuration in which an engagement pin is provided in the first case portion 129 and an engagement hole is provided in the second case portion 131. In addition, the plurality of case engagement portions 195 may have a configuration in which the case engagement portion 195 in which the engagement pin is provided in the second case portion 131 and the engagement hole is provided in the first case portion 129, and the case engagement portion 195 in which the engagement pin is provided in the first case portion 129, and the engagement hole is provided in the second case portion 131 are mixed.

The second case portion 131 is not limited to the configuration including three members formed of different members from each other, that is, the second A case portion 133, the second B case portion 135, and the second C case portion 137. The second case portion 131 may be configured to include a single member, may be configured to include two members, or may be configured to include four or more members.

The first path 201 is not limited to the section of the tape path 119 from the cartridge-side tape inlet 115 to the front of the case opening 203. For example, the first path 201 may be a section of the tape path 119 from the cartridge-side tape inlet 115 to a point between the cartridge-side tape inlet 115 and the case opening 203. That is, in the second A case portion 133, the first path 201 may have a configuration in which a section of the tape path 119 from the cartridge-side tape inlet 115 to a point between the cartridge-side tape inlet 115 and the case opening 203 can be opened and closed in the +Z direction.

ADDITIONAL NOTES

A description of a ribbon cartridge is added.

There is provided a ribbon cartridge configured to be mounted on a tape printing apparatus including: an ink ribbon; and a cartridge case that accommodates the ink ribbon, in which the cartridge case includes a first case portion, and a second case portion provided in a first direction with respect to the first case portion, the cartridge case is provided with a tape inlet that is formed in a long shape in a direction parallel to the first direction, and introduces a tape from an outside of the cartridge case into the cartridge case, and a tape outlet that discharges the tape introduced into the cartridge case to the outside of the cartridge case, the first case portion and the second case portion are combined by a plurality of case engagement portions including an engagement projection portion provided at one of the first case portion and the second case portion and an engagement recess portion provided at another of the first case portion and the second case portion and engaged with the engagement projection portion, and the tape inlet is provided at a position at which a distance from one case engagement portion of the plurality of case engagement portions is smaller than a dimension of the tape inlet in a lateral direction of the tape inlet.

With this configuration, it is possible to prevent a decrease in rigidity of the cartridge case due to the provision of the tape inlet.

The cartridge-side tape inlet 115 is an example of the "tape inlet". The second B engagement pin 235 is an example of the "engagement projection portion". The first B engagement hole 191 is an example of the "engagement recess portion". The +Z direction is an example of the "first direction".

In this case, in the ribbon cartridge, the second case portion may include a second A case portion, and a second B case portion made of a member different from a member of the second A case portion, and the tape inlet may be provided between the second A case portion and the second B case portion.

With this configuration, the tape inlet can be formed by using a gap between the second A case portion and the second B case portion.

In this case, in the ribbon cartridge, the second A case portion may be configured to open and close the tape inlet in the first direction.

With this configuration, by opening the tape inlet in the first direction, the user can insert the tape into the tape inlet from the first direction. Further, by closing the tape inlet in the first direction, it is possible to prevent movement of the tape inserted into the tape path in a width direction of the tape when the ribbon cartridge is mounted in the tape printing apparatus.

In this case, in the ribbon cartridge, the second A case portion may be provided with two finger hook portions on which a user hooks fingers when the user operates the second A case portion such that the tape inlet is opened in the first direction.

With this configuration, the user can easily perform an operation of opening the tape inlet in the first direction by using the two finger hook portions.

In this case, the ribbon cartridge may further include: a tape pressing portion that presses the tape introduced into the cartridge case against the first case portion, in which the first case portion and the second A case portion may form an outer shell of a tape presser accommodating portion in which the tape pressing portion is accommodated, and the second A case portion may be configured to open and close the tape presser accommodating portion in the first direction.

With this configuration, by opening the tape presser accommodating portion in the first direction, the user can operate the tape pressing portion from the first direction. In addition, since the tape presser accommodating portion is closed in the first direction, it is possible to prevent a foreign matter from entering the tape accommodating portion.

In this case, in the ribbon cartridge, the tape pressing portion may be movable between a pressing position for pressing the tape against the first case portion and a separation position spaced apart from the tape.

With this configuration, the user can easily insert the tape between the tape pressing portion and the first case portion by moving the tape pressing portion to the separation position.

In this case, in the ribbon cartridge, the second A case portion may be detachably combined with the first case portion and may be detached from the first case portion to open the tape presser accommodating portion in the first direction.

With this configuration, the user can open the tape presser accommodating portion in the first direction by detaching the second A case portion from the first case portion.

In this case, in the ribbon cartridge, the first case portion may be provided with a holding portion configured to hold the tape pressing portion at the separation position when the second A case portion is detached from the first case portion.

With this configuration, when the user detaches the second A case portion from the first case portion and inserts the tape between the tape pressing portion and the first case portion, the tape pressing portion can be held at the separation position by the holding portion. Therefore, the user does not need to manually hold the tape pressing portion such that the tape pressing portion is located at the separation position, and thus it is possible to improve operability.

In this case, in the ribbon cartridge, the second A case portion may be provided with a release portion that releases the holding of the tape pressing portion by the holding portion, by engaging with the tape pressing portion when the second A case portion is mounted on the first case portion.

With this configuration, the user can release the holding of the tape pressing portion by the holding portion without performing an operation for releasing the holding of the tape pressing portion by the holding portion, apart from the operation of mounting the second A case portion on the first case portion.

In this case, in the ribbon cartridge, the tape pressing portion may be provided with a pressing projection portion on which a user hooks a finger when the user moves the tape pressing portion.

With this configuration, the user can easily move the tape pressing portion by using the pressing projection portion.

In this case, in the ribbon cartridge, the second A case portion may be connected to the first case portion via a hinge portion and may be rotated around the hinge portion with respect to the first case portion to open the tape presser accommodating portion in the first direction.

With this configuration, the user can open the tape presser accommodating portion in the first direction by rotating the second A case portion around the hinge portion with respect to the first case portion.

In this case, the ribbon cartridge may further include: a connecting portion that connects the tape pressing portion and the second A case portion, in which when the second A case portion is rotated in a direction in which the tape presser accommodating portion is opened in the first direction, the tape pressing portion may be moved to the separation position in conjunction with the rotation of the second A case portion, and when the second A case portion is rotated in a direction in which the tape presser accommodating portion is closed in the first direction, the tape pressing portion may be moved to the pressing position in conjunction with the rotation of the second A case portion.

With this configuration, the user can move the tape pressing portion to the separation position without performing an operation of moving the tape pressing portion to the separation position, apart from the operation of rotating the second A case portion with respect to the first case portion. In addition, the user can move the tape pressing portion to the pressing position without performing an operation of moving the tape pressing portion to the pressing position, apart from the operation of rotating the second A case portion with respect to the first case portion.

In this case, the ribbon cartridge may further include: an elastic member that applies a force to the tape pressing portion toward the pressing position.

With this configuration, the tape pressing portion can appropriately press the tape by the elastic force of the elastic member.

In this case, in the ribbon cartridge, the first case portion may be provided with a tape pressing support shaft that rotatably supports the tape pressing portion between the pressing position and the separation position, and the tape pressing portion may include an arm portion rotatably supported by the tape pressing support shaft, and a tape contact portion that is provided at the arm portion, and comes into contact with the tape when the tape pressing portion is located at the pressing position.

With this configuration, the tape is pinched between the tape contact portion and the first case portion.

In this case, in the ribbon cartridge, the first case portion may be provided with a first projection portion projecting in the first direction, and the arm portion may be slid with the first projection portion while rotating.

With this configuration, the rotation of the arm portion can be guided by the first projection portion.

In this case, in the ribbon cartridge, the second A case portion may be provided with a second projection portion projecting in a second direction opposite to the first direction, and the arm portion may be slid with the second projection portion while rotating.

With this configuration, the rotation of the arm portion can be guided by the second projection portion.

The +Z direction is an example of the "second direction".

What is claimed is:

1. A ribbon cartridge configured to be mounted on a tape printing apparatus, the ribbon cartridge comprising:
an ink ribbon; and
a cartridge case that accommodates the ink ribbon, wherein
the cartridge case includes
a first case portion, and
a second case portion provided in a first direction with respect to the first case portion,
the cartridge case is provided with
a tape inlet that is formed in a long shape in a direction parallel to the first direction, and introduces a tape from an outside of the cartridge case into the cartridge case, and
a tape outlet that discharges the tape introduced into the cartridge case to the outside of the cartridge case,
the first case portion and the second case portion are combined by a plurality of case engagement portions including an engagement projection portion provided at one of the first case portion and the second case portion and an engagement recess portion provided at another of the first case portion and the second case portion and engaged with the engagement projection portion, and
in a lateral direction of the tape inlet that is perpendicular to the first direction,
the tape inlet and one case engagement portion of the plurality of case engagement portions are separated by a distance D,
the tape inlet has a dimension W in the lateral direction, and
D<W.

2. The ribbon cartridge according to claim 1, wherein
the second case portion includes
a second A case portion, and
a second B case portion made of a member different from a member of the second A case portion, and
the tape inlet is provided between the second A case portion and the second B case portion.

3. The ribbon cartridge according to claim 2, wherein
the second A case portion is configured to open and close the tape inlet in the first direction.

4. The ribbon cartridge according to claim 3, wherein
the second A case portion is provided with two finger hook portions on which a user hooks fingers when the user operates the second A case portion such that the tape inlet is opened in the first direction.

5. The ribbon cartridge according to claim 2, further comprising:
a tape pressing portion that presses the tape introduced into the cartridge case against the first case portion, wherein
the first case portion and the second A case portion form an outer shell of a tape presser accommodating portion in which the tape pressing portion is accommodated, and
the second A case portion is configured to open and close the tape presser accommodating portion in the first direction.

6. The ribbon cartridge according to claim 5, wherein
the tape pressing portion is movable between a pressing position for pressing the tape against the first case portion and a separation position spaced apart from the tape.

7. The ribbon cartridge according to claim 6, wherein
the second A case portion is detachably combined with the first case portion and is detached from the first case portion to open the tape presser accommodating portion in the first direction.

8. The ribbon cartridge according to claim 7, wherein
the first case portion is provided with a holding portion configured to hold the tape pressing portion at the separation position when the second A case portion is detached from the first case portion.

9. The ribbon cartridge according to claim 8, wherein
the second A case portion is provided with a release portion that releases the holding of the tape pressing portion by the holding portion, by engaging with the tape pressing portion when the second A case portion is mounted on the first case portion.

10. The ribbon cartridge according to claim 7, wherein
the tape pressing portion is provided with a pressing projection portion on which a user hooks a finger when the user moves the tape pressing portion.

11. The ribbon cartridge according to claim 6, wherein
the second A case portion is connected to the first case portion via a hinge portion and is rotated around the hinge portion with respect to the first case portion to open the tape presser accommodating portion in the first direction.

12. The ribbon cartridge according to claim 11, further comprising:
a connecting portion that connects the tape pressing portion and the second A case portion, wherein
when the second A case portion is rotated in a direction in which the tape presser accommodating portion is opened in the first direction, the tape pressing portion is moved to the separation position in conjunction with the rotation of the second A case portion, and
when the second A case portion is rotated in a direction in which the tape presser accommodating portion is closed in the first direction, the tape pressing portion is moved to the pressing position in conjunction with the rotation of the second A case portion.

13. The ribbon cartridge according to claim 6, further comprising:
an elastic member that applies a force to the tape pressing portion toward the pressing position.

14. The ribbon cartridge according to claim 6, wherein
the first case portion is provided with a tape pressing support shaft that rotatably supports the tape pressing portion between the pressing position and the separation position, and
the tape pressing portion includes
an arm portion rotatably supported by the tape pressing support shaft, and
a tape contact portion that is provided at the arm portion, and comes into contact with the tape when the tape pressing portion is located at the pressing position.

15. The ribbon cartridge according to claim 14, wherein
the first case portion is provided with a first projection portion projecting in the first direction, and
the arm portion is slid with the first projection portion while rotating.

16. The ribbon cartridge according to claim 14, wherein
the second A case portion is provided with a second projection portion projecting in a second direction opposite to the first direction, and the arm portion is slid with the second projection portion while rotating.

* * * * *